United States Patent
Ohta et al.

(10) Patent No.: US 10,220,848 B2
(45) Date of Patent: Mar. 5, 2019

(54) BRAKING/DRIVING FORCE CONTROL METHOD AND BRAKING/DRIVING FORCE CONTROL DEVICE

(71) Applicant: Nissan Motor Co., Ltd., Yokohama-shi, Kanagawa (JP)

(72) Inventors: Mitsunori Ohta, Kanagawa (JP); Naoki Miyashita, Kanagawa (JP); Yuuki Shiozawa, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/774,418

(22) PCT Filed: Nov. 9, 2015

(86) PCT No.: PCT/JP2015/005585
§ 371 (c)(1),
(2) Date: May 8, 2018

(87) PCT Pub. No.: WO2017/081713
PCT Pub. Date: May 18, 2017

(65) Prior Publication Data
US 2018/0319397 A1   Nov. 8, 2018

(51) Int. Cl.
*B60W 30/14* (2006.01)
*G06F 19/00* (2018.01)
(Continued)

(52) U.S. Cl.
CPC ........ *B60W 30/143* (2013.01); *B60K 31/00* (2013.01); *B60W 10/04* (2013.01); *B60W 10/18* (2013.01);
(Continued)

(58) Field of Classification Search
CPC ...... B60W 30/14; B60W 10/06; B60W 10/02; G06F 19/00; G06F 7/70; G06F 17/00; B60G 17/018; B60K 1/00; B60K 31/00
See application file for complete search history.

(56) References Cited

U.S. PATENT DOCUMENTS 6,741,923 B2 * 5/2004 Katakura ........... B60K 31/0058
123/361
6,763,295 B2 * 7/2004 Katakura ............... B60K 31/04
701/70
(Continued)

FOREIGN PATENT DOCUMENTS

JP  H07164917 A   6/1995
JP  2001328457 A  11/2001
(Continued)

*Primary Examiner* — Yuri Kan
(74) *Attorney, Agent, or Firm* — Young Basile Hanlon & MacFarlane, P.C.

(57) ABSTRACT

When a driver demand torque is not greater than a target braking/driving torque, the acceleration/deceleration of the vehicle is controlled depending on the target braking/driving torque, when the driver demand torque exceeds the target braking/driving torque, the acceleration/deceleration is controlled depending on the driver demand torque, when the accelerator pedal operation amount decreases after the driver demand torque exceeds the target braking/driving torque, the driver demand torque is decreased depending on the decrease in the accelerator pedal operation amount, the decrease rate of the driver demand torque depending on the decrease in the accelerator pedal operation amount is set to be smaller than the decrease rate for a case where the driver does not set a travelling speed, and the acceleration/deceleration is controlled based on the set driver demand torque, and when the accelerator pedal operation amount becomes zero subsequently, the acceleration/deceleration is controlled depending on the target braking/driving torque.

6 Claims, 19 Drawing Sheets

(51) Int. Cl.
  *B60K 31/00*   (2006.01)
  *B60K 1/00*   (2006.01)
  *B60G 17/018*  (2006.01)
  *B60W 10/04*   (2006.01)
  *B60W 10/18*   (2012.01)

(52) U.S. Cl.
  CPC ....... *B60W 30/14* (2013.01); *B60K 2310/248* (2013.01); *B60W 2510/0657* (2013.01); *B60W 2520/10* (2013.01); *B60W 2540/10* (2013.01); *B60W 2540/103* (2013.01); *B60W 2720/10* (2013.01)

(56) References Cited

U.S. PATENT DOCUMENTS

| | | | | |
|---|---|---|---|---|
| 7,561,954 | B2 * | 7/2009 | Aizawa | B60K 31/00 180/170 |
| 8,721,500 | B2 * | 5/2014 | Bastian | B60W 10/06 477/171 |
| 9,002,578 | B2 * | 4/2015 | Noumura | F16H 61/10 701/1 |
| 9,150,216 | B2 * | 10/2015 | Tojo | B60W 50/06 |
| 9,216,740 | B2 * | 12/2015 | Kato | B60W 30/18027 |
| 2009/0145673 | A1 * | 6/2009 | Soliman | B60W 20/13 180/65.1 |
| 2011/0246042 | A1 | 10/2011 | Tomokuni et al. | |

FOREIGN PATENT DOCUMENTS

| | | |
|---|---|---|
| JP | 2006175943 A | 7/2006 |
| JP | 2008120302 A | 5/2008 |
| JP | 2010132132 A | 6/2010 |

\* cited by examiner

BRAKING/DRIVING FORCE CONTROL METHOD AND BRAKING/DRIVING FORCE CONTROL DEVICE

TECHNICAL FIELD

This invention relates to a braking/driving force control method and a braking/driving force control device.

BACKGROUND

Japanese Patent Application JP2006-175943 A discloses, for example a technology for controlling a braking/driving force of a vehicle.

In the technology disclosed in Japanese Patent Application 2006-175943 A, when a driver sets a constant speed traveling, a vehicle travels at a constant speed by an engine outputting a target braking/driving torque for maintaining the constant speed traveling. During the constant speed traveling, if a driver demand torque corresponding to an operation amount of an accelerator pedal operated by the driver exceeds the target braking/driving torque, even during the constant speed traveling control, an acceleration/deceleration is controlled depending on the driver demand torque.

Relative to the technology disclosed in Japanese Patent Application JP2006-175943 A, during controlling the acceleration/deceleration in response to the driver demand torque, even if the driver demand torque becomes less than the target braking/driving torque, until the operation amount of the accelerator pedal becomes zero, the acceleration/deceleration could be controlled depending on the driver demand torque.

However, when such control is conducted, if the acceleration control depending on the target braking/driving torque is conducted immediately after the operation amount of the accelerator pedal is zero, a discomfort may be caused.

SUMMARY

An object of the present invention is to solve the above described problems and to provide a braking/driving force control method and a braking/driving force control device that suppress the discomfort given to the driver.

To solve the above described problems, according to one aspect of the present invention, when an acceleration/deceleration of a vehicle is controlled based on a target braking/driving torque that allows the vehicle to travel at a travelling speed set by a driver, a state of controlling the acceleration/deceleration of the vehicle based on the target braking/driving torque is maintained until a driver demand torque depending on an operation amount of an accelerator pedal exceeds the target braking/driving torque. Further, when the driver demand torque exceeds the target braking/driving torque, the acceleration/deceleration is controlled depending on the driver demand torque.

When the operation amount of the accelerator pedal decreases after the driver demand torque exceeds the target braking/driving torque, the driver demand torque is reduced depending on the decrease in the operation amount of the accelerator pedal. Additionally, a decrease rate of the driver demand torque depending on the decrease in the operation amount of the accelerator pedal is set to be smaller than the decrease rate of the driver demand torque depending on the operation amount of the accelerator pedal for a case where the driver does not set the travelling speed. The acceleration/deceleration is controlled based on the set driver demand torque, and then, when the operation amount of the accelerator pedal becomes zero subsequently, the process returns to a state where the acceleration/deceleration is controlled based on the target braking/driving torque.

BRIEF DESCRIPTION OF THE DRAWINGS

FIG. 18A is a time chart illustrating operations of a vehicle including the braking/driving force control device according to the first embodiment of the present invention; FIG. 18B is a time chart illustrating operations of the vehicle not including the braking/driving force control device according to the first embodiment of the present invention;

FIG. 20A is a time chart illustrating operations of the vehicle not including the braking/driving force control device according to the first embodiment of the present invention; FIG. 20B is a time chart illustrating operations of the vehicle including the braking/driving force control device according to the first embodiment of the present invention.

DETAILED DESCRIPTION

Figure 1:
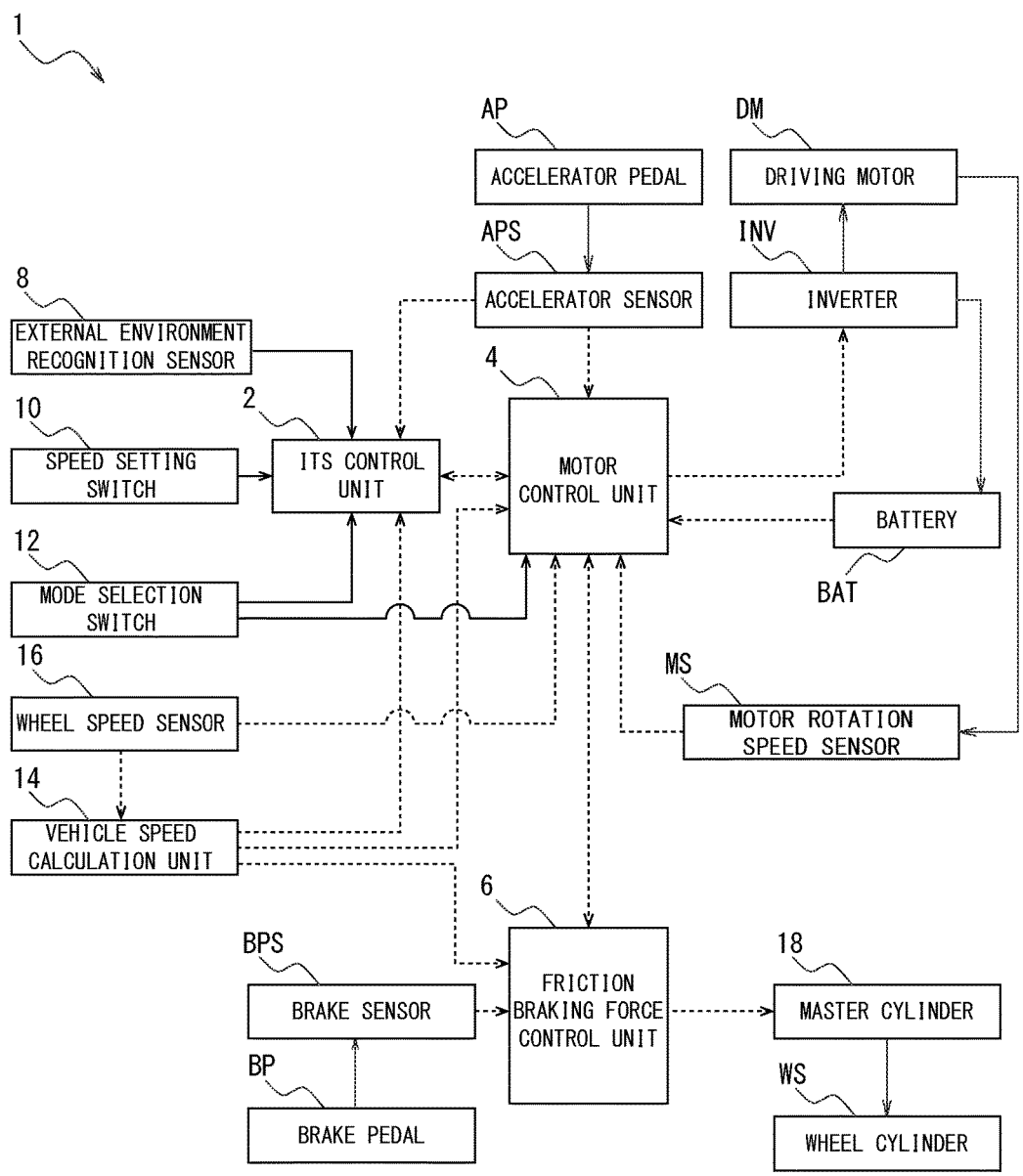
FIG. 1 is a block diagram illustrating a configuration of a braking/driving force control device according to a first embodiment of the present invention.

Specific details are described below to provide complete understanding of embodiments of the present invention. However, even if the specific details are not described, it is clear that one or more embodiments can be carried out. Further, the well-known structures and devices may be represented schematically to simplify the drawing.

First Embodiment

The first embodiment of the present invention is described below with reference to drawings.

(Configuration of Braking/Driving Force Control Device)

With reference to FIG. 1 to FIG. 17, a configuration of a braking/driving force control device 1 according to the first embodiment is described.

As illustrated in FIG. 1, the braking/driving force control device 1 includes an ITS control unit 2, a motor control unit 4, and a friction braking force control unit 6.

The ITS control unit 2 is configured from, for example, a microcomputer.

Note that the microcomputer includes, for example, Central Processing Unit (CPU), Random Access Memory (RAM), Read Only Memory (ROM) and the like.

The ITS control unit 2 receives information signals from an external environment recognition sensor 8, a speed setting switch 10, a mode selection switch 12, a vehicle speed calculation unit 14, an accelerator sensor APS, and the motor control unit 4.

The ITS control unit 2, using various received information signals, controls a braking force and a driving force generated to a vehicle C including the braking/driving force control device 1. The braking force controlled by the ITS control unit 2 is the braking force that is controlled separately from a braking force request by a driver of a vehicle C. Similarly, the driving force controlled by the ITS control unit 2 is the driving force that is controlled separately from the driving force request by a driver of the vehicle C.

The external environment recognition sensor 8 is formed from, for example, an image capturing device such as a wide-angle camera and a distance measuring device such as a laser range finder (LRF).

The external environment recognition sensor 8, using the image capturing device and the distance measuring device, detects a control object that is present at the circumference of the vehicle C (especially, in front of vehicle C). The external environment recognition sensor 8 that has detected the control object present at the circumference of the vehicle C outputs the information signal including the detected control object (hereinafter, sometimes referred to as "control object signal") to the ITS control unit 2.

Note that, the control objects are, for example, other vehicles such as preceding vehicles, pedestrians, animals, guard rails, curbstones, and a lane marking.

The speed setting switch 10 is a switch for setting the travelling speed (control speed) of the vehicle C when the constant speed traveling control is conducted. Further, the speed setting switch 10 is formed from a switch (lever, button or the like) disposed at a position (such as steering wheel) where an occupant of the vehicle C (driver or the like) can operate the switch.

The speed setting switch 10 outputs an information signal including the set travelling speed (set speed) (hereinafter sometimes referred to as "set speed signal") to the ITS control unit 2.

Note that the constant speed traveling control includes an automatic speed control (control for travelling vehicle C at a set travelling speed without pedaling accelerator pedal by driver) and controlling of a braking force or a driving force depending on the control object.

Although not especially illustrated, whether or not to conduct the constant speed traveling control is selected by operating the switch (constant speed traveling control setting switch) disposed at a position (such as a steering wheel) where the occupant of the vehicle C can operate the switch.

The mode selection switch 12 is a switch for selecting either one of a "one pedal mode" or a "two pedal mode" as a mode (control mode) for controlling the braking force and the driving force of the vehicle C.

The "one pedal mode" is a control mode for controlling the braking force and the driving force of the vehicle C depending mainly on the operation of the accelerator pedal AP.

Hereinafter, control details of the braking force and the driving force depending on the operation amount of the accelerator pedal AP in the "one pedal mode" are specifically described. In the following descriptions, it is assumed that the vehicle C travels on a flat road surface.

When the Accelerator Pedal AP is not Operated

When the accelerator pedal AP is not operated (including a case where accelerator pedal is not pedaled beyond free movement), the braking force depending on the holding stop-state necessary braking torque is generated.

The holding stop-state necessary braking torque is a braking torque for holding the stopped state of the vehicle C and is set based on, for example, a weight of the vehicle C, a capability of generating a regenerative braking force, and a capability of generating a friction braking force.

When the Operation Amount of the Accelerator Pedal AP is within a Braking Range

When the operation amount of the accelerator pedal AP is within the braking range, in response to the increase in the operation amount of the accelerator pedal AP, a braking force smaller than the braking force depending on the holding stop-state necessary braking torque is generated.

The braking range is a range corresponding to the operation amount of the accelerator pedal AP from an unoperated state to a braking/driving force switching operation amount.

The braking/driving force switching operation amount corresponds to, among the operation amounts (opening degree) of the accelerator pedal AP, the operation amount (opening degree) for switching between the driving force and the braking force generated to the vehicle C. Note that the braking/driving force switching operation amount is set to the operation amount (opening degree) of the accelerator pedal AP of about 25%.

When the Operation Amount of the Accelerator Pedal AP is within a Driving Range.

When the operation amount of the accelerator pedal AP is within the driving range, the driving force is generated to be increased depending on the increased amount of the operation amount of the accelerator pedal AP over the braking/driving force switching operation amount.

The driving range is a range corresponding to the operation amount exceeding the braking/driving force switching operation amount of the accelerator pedal AP.

From the above, in the "one pedal mode", when the operation amount of the accelerator pedal AP is equal to or less than the braking/driving force switching operation amount, the driving force is not generated to the vehicle C. Therefore, a creep phenomenon is not caused to the vehicle having the braking/driving force control device 1 according to the first embodiment. The creep phenomenon is a phenomenon caused to an automatic transmission (AT) vehicle that includes an internal-combustion engine as a drive source.

Note that although via the operation of the unillustrated switch or the like, a control for causing the creep phenomenon similar to that of the AT vehicle may be conducted, in the first embodiment, a control for not causing the creep phenomenon similar to that of the AT vehicle is described.

Therefore, when the operation amount of the accelerator pedal AP is less than a threshold value set in advance, the braking/driving force control device 1 according to the first embodiment generates the braking force depending on the operation amount of the accelerator pedal AP that is less than the threshold value and the travelling speed of the vehicle C.

Further, when the operation amount of the accelerator pedal AP is equal to or larger than the threshold value, the braking/driving force control device 1 according to the first embodiment generates the driving force depending on the operation amount of the accelerator pedal AP that is equal to or larger than the threshold value and the travelling speed of the vehicle C.

The "two pedal mode" is a control mode in which the braking force of the vehicle C is controlled in accordance with the operation of mainly a brake pedal BP and the driving force of the vehicle C is controlled in accordance with the operation of the accelerator pedal AP.

Specifically, in the "two pedal mode", when the accelerator pedal AP is operated (pedaled), the driving force is generated. Further, as the operation amount of the accelerator pedal AP increases, the driving force increases.

In the "two pedal mode", when the operation state of the accelerator pedal AP is shifted from an operated state to an unoperated state, a braking force corresponding to the engine brake is caused, which braking force is generally caused to a vehicle having an internal-combustion engine as a drive source. Via operations of unillustrated switches or the like, a control for not causing the braking force corresponding to the engine brake may be conducted.

The mode selection switch 12 is formed from a switch (dial or the like) disposed at a position (such as a dash board) where the occupant of the vehicle C can operate the switch.

The mode selection switch 12 outputs an information signal including a selection result of a control mode (hereinafter sometimes referred to as "select mode signal") to the ITS control unit 2 and the motor control unit 4.

The vehicle speed calculation unit 14 receives, from a wheel speed sensor 16, a wheel speed signal including a revolution speed of a wheel. The vehicle speed calculation unit 14, using the revolution speed included in the wheel speed signal, calculates the travelling speed of the vehicle C (hereinafter sometimes referred to as "vehicle speed"). Additionally, the vehicle speed calculation unit 14 outputs an information signal including the calculated vehicle speed (hereinafter sometimes referred to as "vehicle speed signal") to the ITS control unit 2, the motor control unit 4, and the friction braking force control unit 6.

Note that the vehicle speed calculation unit 14 may be included in, for example, a known Vehicle Dynamics Control (VDC) system.

Figure 2:
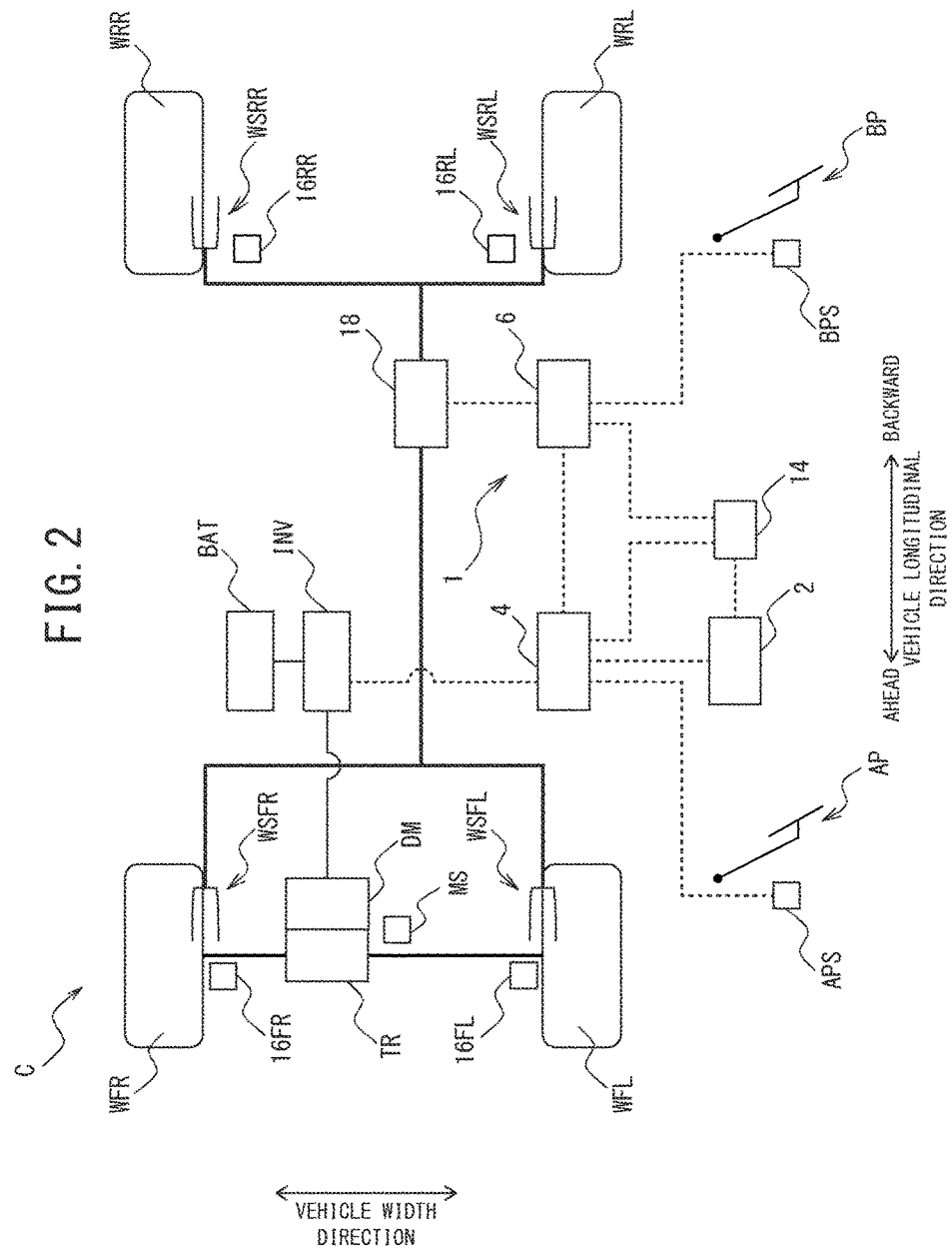
FIG. 2 is a block diagram illustrating a configuration of a vehicle including the braking/driving force control device according to the first embodiment of the present invention.

The wheel speed sensor 16 is, as illustrated in FIG. 2, mounted to the vehicle C. The wheel speed sensor 16 generates the predetermined number of wheel speed pulses for one rotation of the wheel W of the vehicle C.

Further, the wheel speed sensor 16 outputs the wheel speed signal including the revolution speed of the wheel to the motor control unit 4.

The accelerator sensor APS is a sensor for detecting the operation amount (pedaling operation amount) of the accelerator pedal AP by the driver.

The accelerator pedal AP is a pedal provided to the vehicle C and a pedal pedaled by the driver of the vehicle C in response to the braking force request or the driving force request.

Note that the accelerator sensor APS is formed by using, for example, a pedal stroke sensor. Further, a configuration of the accelerator sensor APS is not limited to be formed using the pedal stroke sensor, but may be a configuration in which, for example, the opening degree of the accelerator pedal AP by the pedaling operation of the driver is detected.

In other words, the accelerator sensor APS is a sensor for detecting the operation amount of the accelerator pedal AP by the driver.

Note that detailed configurations of the ITS control unit 2 are described later.

The motor control unit 4 controls the regenerative braking force and the driving force generated to the vehicle C. Further, the motor control unit 4, similarly to the ITS control unit 2, is configured from, for example, a microcomputer.

The motor control unit 4 receives information signals from the ITS control unit 2, the mode selection switch 12, the vehicle speed calculation unit 14, the wheel speed sensor 16, the accelerator sensor APS, a motor rotation speed sensor MS, and the friction braking force control unit 6.

Descriptions of the mode selection switch 12, the vehicle speed calculation unit 14, the wheel speed sensor 16, and the accelerator sensor APS are omitted because the descriptions of those elements are already made above.

The motor rotation speed sensor MS is formed from, for example, a resolver that detects the rotation speed (rotation state) of a motor driving force output shaft of the driving motor DM.

The motor rotation speed sensor MS, in response to an output shaft pulse signal, detects the rotation speed (rotation state) of the motor driving force output shaft. Then, the motor rotation speed sensor MS outputs an output shaft rotation speed signal including the detected rotation speed to the motor control unit 4.

The output shaft pulse signal is a pulse signal representing a rotation state of the motor driving force output shaft.

Note that detailed configurations of the motor control unit 4 are described later.

The friction braking force control unit 6 controls a friction braking force generated to the vehicle C. The friction braking force control unit 6, similarly to the motor control unit 4, is configured from, for example, a microcomputer.

The friction braking force control unit 6 receives information signals from the motor control unit 4, the vehicle speed calculation unit 14, and a brake sensor BPS.

Descriptions of the vehicle speed calculation unit 14 are omitted because the descriptions of the unit are already made above.

The brake sensor BPS is a sensor for detecting the operation amount (pedaling operation amount) of a brake pedal BP by the driver.

The brake pedal BP is a pedal provided to the vehicle C, is a pedal pedaled by the driver of the vehicle C only in response to the braking force request, and is a pedal that is provided separately from the accelerator pedal AP.

The brake sensor BPS outputs an information signal including the operation amount of the brake pedal BP by the driver to the friction braking force control unit 6.

Note that the brake sensor BPS is formed by using, for example, a pedal stroke sensor. A configuration of the brake sensor BPS is not limited to be formed using the pedal stroke sensor, but may be a configuration in which the opening degree of the brake pedal BP by the pedaling operation of the driver is detected.

In other words, the brake sensor BPS is a sensor that detects the operation amount of the brake pedal BP by the driver.

Note that detailed configurations of the friction braking force control unit 6 are described later.

(Detailed Configurations of ITS Control Unit 2)

Figure 3:
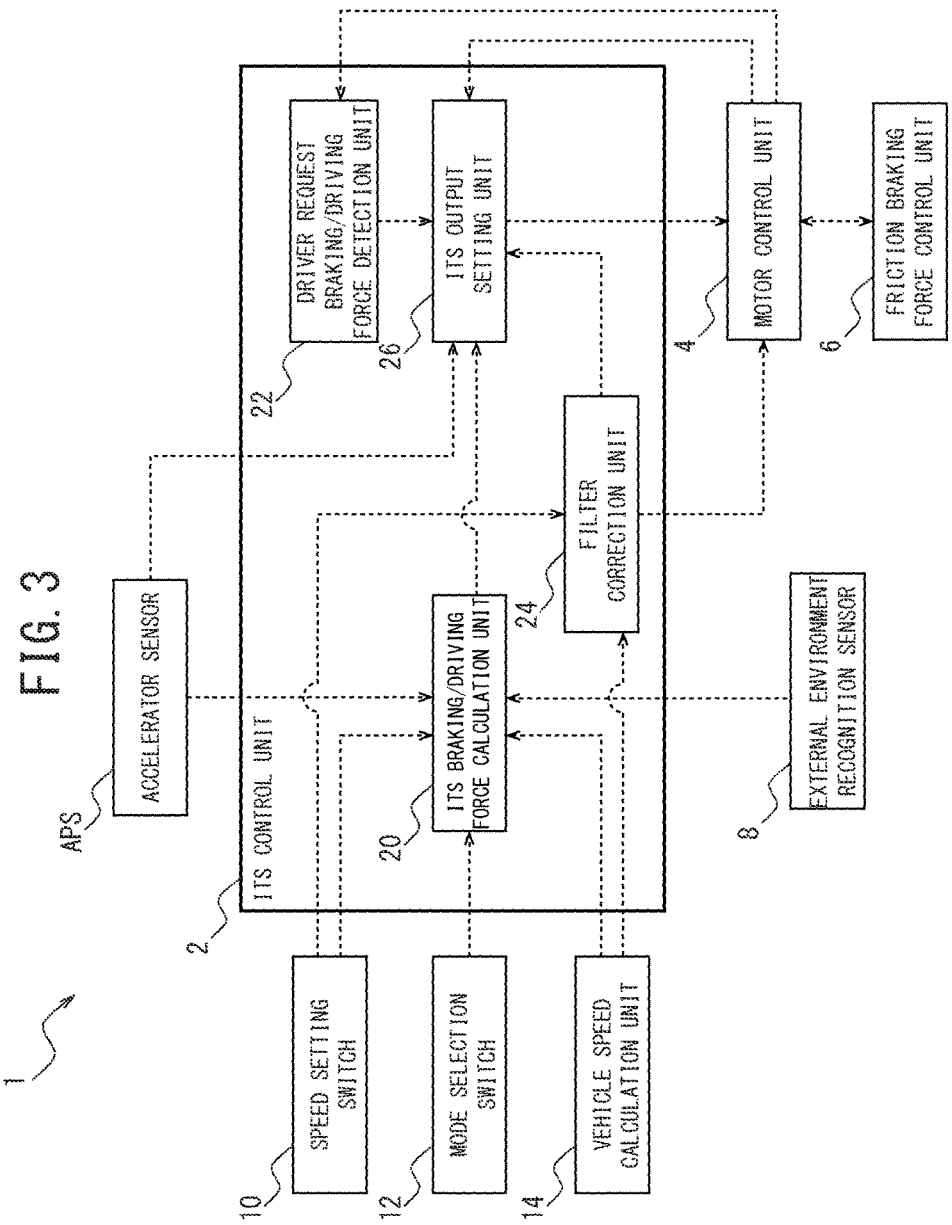
FIG. 3 is a block diagram illustrating a configuration of an ITS control unit.

The ITS control unit 2, as illustrated in FIG. 3, includes the ITS braking/driving force calculation unit 20, a driver request braking/driving force detection unit 22, a filter correction unit 24, and an ITS output setting unit 26.

The ITS braking/driving force calculation unit 20 receives the set speed signal, the select mode signal, the vehicle speed signal, and the control object signal. Additionally, the ITS braking/driving force calculation unit 20 receives, from the accelerator sensor APS, an information signal including the operation amount (braking/driving force operation amount) of the accelerator pedal AP.

The ITS braking/driving force calculation unit 20 calculates the driving force or the braking force generated to the vehicle C depending on the control mode included in the select mode signal and a deviation (speed difference) between the set speed included in the set speed signal and the vehicle speed included in the vehicle speed signal.

For example, when the vehicle speed is less than the set speed, the ITS braking/driving force calculation unit 20 increases the driving force (decreases braking force). On the other hand, when the vehicle speed exceeds the set speed, the ITS braking/driving force calculation unit 20 decreases the driving force (increases braking force).

The ITS braking/driving force calculation unit 20, based on the control object included in the control object signal, corrects the driving force or the braking force that is calculated depending on the speed difference between the set speed included in the set speed signal and the vehicle speed included in the vehicle speed signal.

The correction of the driving force or the braking force conducted by the ITS braking/driving force calculation unit 20 is the correction of increasing the braking force when, for example, the control object is present in a travelling direction of the vehicle C and as the distance between the control object and the vehicle C is shorter. Further, the correction of the driving force or the braking force conducted by the ITS braking/driving force calculation unit 20 is the correction of increasing the driving force when, for example, the control object is present in the traveling direction of the vehicle C and as the distance between the control object and the vehicle C is shorter.

The ITS braking/driving force calculation unit 20 that calculates the braking force or the driving force generated to the vehicle C outputs an information signal including the calculated braking force or driving force (hereinafter sometimes referred to as "ITS braking/driving force signal") to the ITS output setting unit 26.

The driver request braking/driving force detection unit 22 receives, from the motor control unit 4, a corrected driving force signal or a corrected braking force signal.

The corrected driving force signal is an information signal including a corrected driving force obtained by correcting, based on a direction and a magnitude of a road surface slope (slope of traveling road surface), the driving force depending on the operation amount of the accelerator pedal AP and the travelling speed of the vehicle C.

The corrected braking force signal is an information signal including the corrected braking force obtained by correcting, based on a direction and a magnitude of a road surface slope, the braking force depending on the operation amount of the accelerator pedal AP and the travelling speed of the vehicle C.

The driver request braking/driving force detection unit 22 that has received the corrected driving force signal, based on the driving force included in the corrected driving force signal, detects the driving force (driver request driving force) that seems to be requested by the driver of the vehicle C.

The driver request braking/driving force detection unit 22 that has received the corrected braking force signal, based on the braking force included in the corrected braking force signal, detects the braking force (driver request braking force) that seems to be requested by the driver of the vehicle C.

The driver request braking/driving force detection unit 22 that has detected the driver request driving force outputs an information signal including the detected driver request driving force (hereinafter sometimes referred to as "driver request driving force signal") to the ITS output setting unit 26.

The driver request braking/driving force detection unit 22 that has detected the driver request braking force outputs an information signal including the detected driver request braking force (hereinafter sometimes referred to as "driver request braking force signal") to the ITS output setting unit 26.

The filter correction unit 24 receives a set speed signal, a vehicle speed signal, and a Dr override determination signal.

The Dr override determination signal is an information signal including a determination result as to whether or not a driver override is established. The driver override indicates a state in which the driver of the vehicle C has a control right of the driving force or the braking force of the vehicle C.

The filter correction unit 24, using various parameters included in the received information signal, corrects a filter (the ITS braking/driving force filter) used for processes of the ITS output setting unit 26.

The filter correction unit 24 that has corrected ITS braking/driving force filter outputs an information signal including the corrected ITS braking/driving force filter (corrected filter) (hereinafter sometimes referred to as "corrected filter signal") to the ITS output setting unit 26.

Note that detailed configurations of the filter correction unit 24 and processes of correcting the ITS braking/driving force filter by the filter correction unit 24 are described later.

The ITS output setting unit 26 receives the ITS braking/driving force signal, the driver request driving force signal or the driver request braking force signal, the corrected filter signal, and the Dr override determination signal.

The ITS output setting unit 26 selects any one of the braking force or the driving force included in the ITS braking/driving force signal, the driver request driving force included in the driver request driving force signal, and the driver request braking force included in the driver request braking force signal.

Further, the ITS output setting unit 26 corrects any one selected among the braking force, the driving force, the driver request driving force, and the driver request braking force through the corrected filter included in the corrected filter signal to calculate a corrected ITS braking/driving force.

The ITS output setting unit 26 that has calculated the corrected ITS braking/driving force outputs an information signal including the corrected ITS braking/driving force (hereinafter sometimes referred to as "corrected ITS output signal") to the motor control unit 4.

Note that detailed configurations of the ITS output setting unit 26 and processes of correcting the ITS braking/driving force filter by the filter correction unit 24 are described later. Further, processes of selecting any one of the braking force or the driving force included in the ITS braking/driving force signal, the driver request driving force, and the driver request braking force by the ITS output setting unit 26 are described later. Processes of calculating the corrected ITS braking/driving force by the ITS output setting unit 26 are described later.

(Detailed Configurations of Filter Correction Unit 24)

Figure 4:
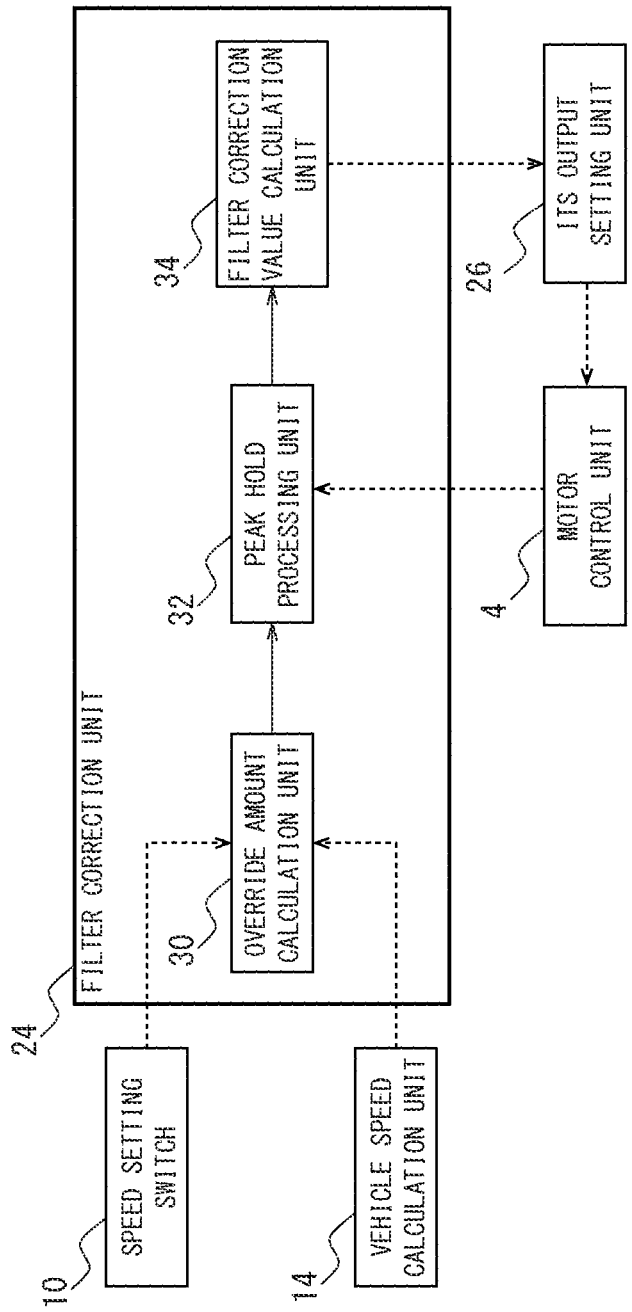
FIG. 4 is a block diagram illustrating a configuration of a filter correction unit.

The filter correction unit 24 includes, as illustrated in FIG. 4, an override amount calculation unit 30, a peak hold processing unit 32, and a filter correction value calculation unit 34.

The override amount calculation unit 30 receives the set speed signal and the vehicle speed signal.

The override amount calculation unit 30 stores in advance an override amount calculation map.

Figure 5:
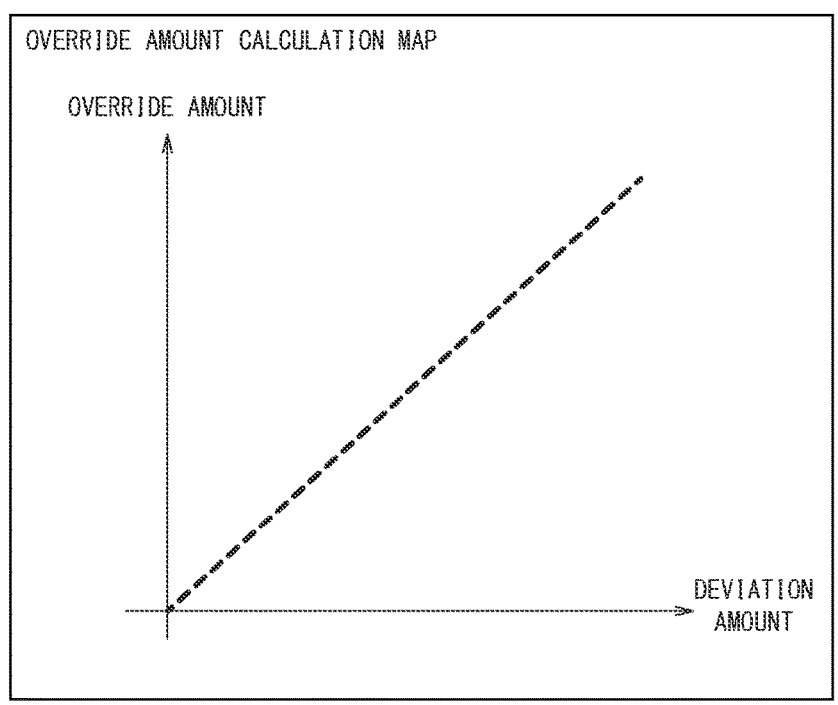
FIG. 5 is a drawing illustrating an override amount calculation map.

The override amount calculation map is, as illustrated in FIG. 5, a map indicating a relationship between a deviation amount and an override amount. Further, the override amount calculation map is, as illustrated in FIG. 5, a map set in advance such that when the deviation amount is a minimum deviation amount set in advance, the override amount becomes a minimum override value set in advance.

Note that in the first embodiment, as one example, a case where a minimum deviation amount is set to zero ("0") is described. Further, in the first embodiment, as one example, a case where a minimum override value is set to zero ("0") is described.

The deviation amount is a value (speed difference) obtained by subtracting, from the vehicle speed included in the vehicle speed signal (current travelling speed of vehicle C), the set speed included in the set speed signal. In other words, the deviation amount is an amount by which the travelling speed calculated (detected) by the vehicle speed calculation unit 14 exceeds the travelling speed (set speed) set by the speed setting switch 10.

The override amount is a value that changes depending on a change of the deviation amount. In other words, the override amount is a value depending on the deviation amount.

In the first embodiment, as one example, a case where a relationship between the change in the deviation amount and the change in the override amount is a directly proportional relationship is described.

Therefore, the override amount in the first embodiment is an amount (speed difference) by which the travelling speed depending on the operation amount of the accelerator pedal AP by the driver exceeds the set speed in the constant speed traveling control.

In other words, the override amount in the first embodiment is a value depending on the operation amount of the accelerator pedal AP in a state in which the driver pedals too much the accelerator pedal AP (accelerator override) during the constant speed traveling control.

Further, the override amount calculation unit 30 first calculates the deviation amount, then inputs the calculated deviation amount to the override amount calculation map, and calculates the override amount.

In other words, in the first embodiment, as one example, a case where the override amount is a value equivalent to an amount by which the travelling speed calculated (detected) by the vehicle speed calculation unit 14 exceeds the travelling speed (set speed) set by the speed setting switch 10 is described.

The override amount calculation unit 30 that has calculated the override amount outputs an information signal including the calculated override amount (hereinafter sometimes referred to as "override amount signal") to the peak hold processing unit 32.

Figure 6:
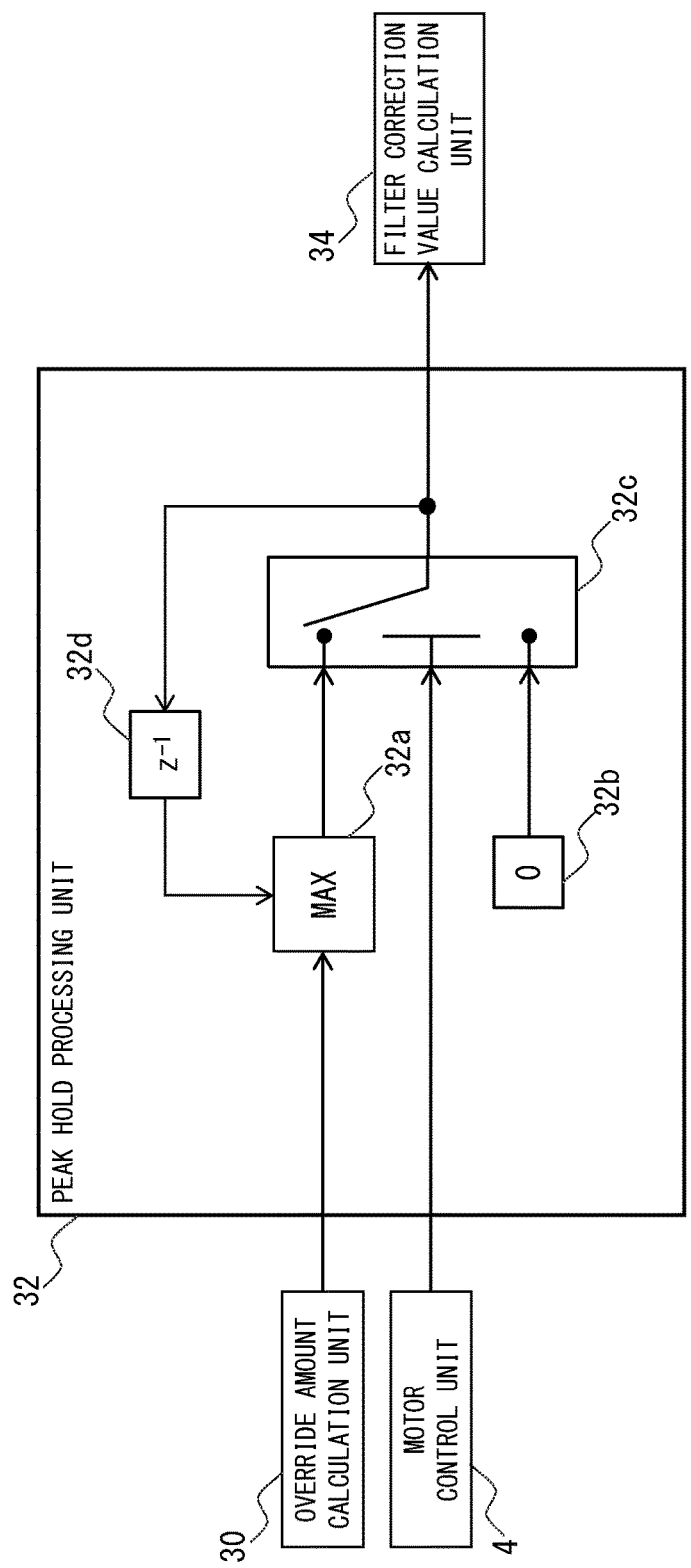
FIG. 6 is a block diagram illustrating a configuration of a peak hold processing unit.

The peak hold processing unit 32, as illustrated in FIG. 6, includes a maximum value selection unit 32a, a lower limit value storage unit 32b, an output value switching unit 32c, and a delay processing unit 32d.

The maximum value selection unit 32a receives, from the override amount calculation unit 30, an override amount signal and receives, from the delay processing unit 32d, a delayed peak value signal.

The delayed peak value signal is an information signal obtained by delaying the override amount signal received by the maximum value selection unit 32a at the last process by one period (one block) of the sampling periods set in advance. Further, one period of the sampling period set in advance is a period in which the peak hold processing unit 32 conducts one process.

The maximum value selection unit 32a compares the override amount included in the override amount signal with the override amount included in the delayed peak value signal, and from between the both override amounts, selects an override amount of a maximum value (MAX) (select-high). The maximum value selection unit 32a that has selected the override amount of the maximum value (peak hold upper limit value) outputs an information signal including the peak hold upper limit value (hereinafter sometimes referred to as "peak hold upper limit value signal") to the output value switching unit 32c.

The lower limit value storage unit 32b stores a peak hold lower limit value set in advance.

The peak hold lower limit value is a lower limit value used for processes conducted by the peak hold processing unit 32. In the first embodiment, as one example, a case where the peak hold lower limit value is set to zero ("0") is described.

The output value switching unit 32c is formed, by using, for example, a switching circuit. The output value switching unit 32c can switch a state between a state in which the maximum value selection unit 32a is connected with the filter correction value calculation unit 34 and the delay processing unit 32d and a state in which the lower limit value storage unit 32b is connected with the filter correction value calculation unit 34 and the delay processing unit 32d.

The output value switching unit 32c refers to the Dr override determination signal that has been received from the motor control unit 4. When the Dr override determination signal includes a determination result that the driver override is established, the output value switching unit 32c connects the maximum value selection unit 32a with the filter correction value calculation unit 34 and the delay processing unit 32d. On the other hand, when the Dr override determination signal includes a determination result that the driver override is not established, the output value switching unit 32c connects the lower limit value storage unit 32b with the filter correction value calculation unit 34 and the delay processing unit 32d.

The output value switching unit 32c that has switched connection states outputs an information signal including the peak hold upper limit value or the peak hold lower limit value (hereinafter sometimes referred to as "processed peak hold value signal") to the filter correction value calculation unit 34.

Note that FIG. 6 illustrates that the output value switching unit 32c switches a state to a state in which the maximum value selection unit 32a is connected with the filter correction value calculation unit 34.

The delay processing unit 32d, depending on a connection state switched by the output value switching unit 32c, conducts, to the peak hold upper limit value or the peak hold lower limit value, the process of delaying by one period of the sampling period set in advance (delay process). Then, the delay processing unit 32d outputs the delayed peak value signal including the peak hold upper limit value or the peak hold lower limit value subjected to the delay process to the maximum value selection unit 32a.

From the above, in the processes conducted by the peak hold processing unit 32, when the Dr override determination signal includes a determination result that the driver override is not established after the constant speed traveling control is stopped, the maximum value of the override amount is held.

Note that the point of time when the Dr override determination signal including the determination result that the driver override is not established is received corresponds to the point of time when the operation amount of the accelerator pedal AP is zero. Therefore, during the processes conducted by the peak hold processing unit 32, from after the constant speed traveling control is stopped to when the operation amount of the accelerator pedal AP is zero (opening degree of accelerator pedal AP is 0[°], the same applies to the following descriptions), the maximum value of the override amount is held. Note that a state in which the operation amount of the accelerator pedal AP is zero is synonymous with a state in which the driver stops the operation of the accelerator pedal AP (OFF).

In other words, in the processes conducted by the peak hold processing unit 32, during the conduction of the constant speed traveling control, from after the driver request braking/driving force exceeds a target value of the driving torque generated to the vehicle C to when the operation amount of the accelerator pedal AP is zero, the override amount is held.

The filter correction value calculation unit 34 receives a processed peak hold value signal.

The filter correction value calculation unit 34 stores in advance the filter correction value calculation map.

Figure 7:
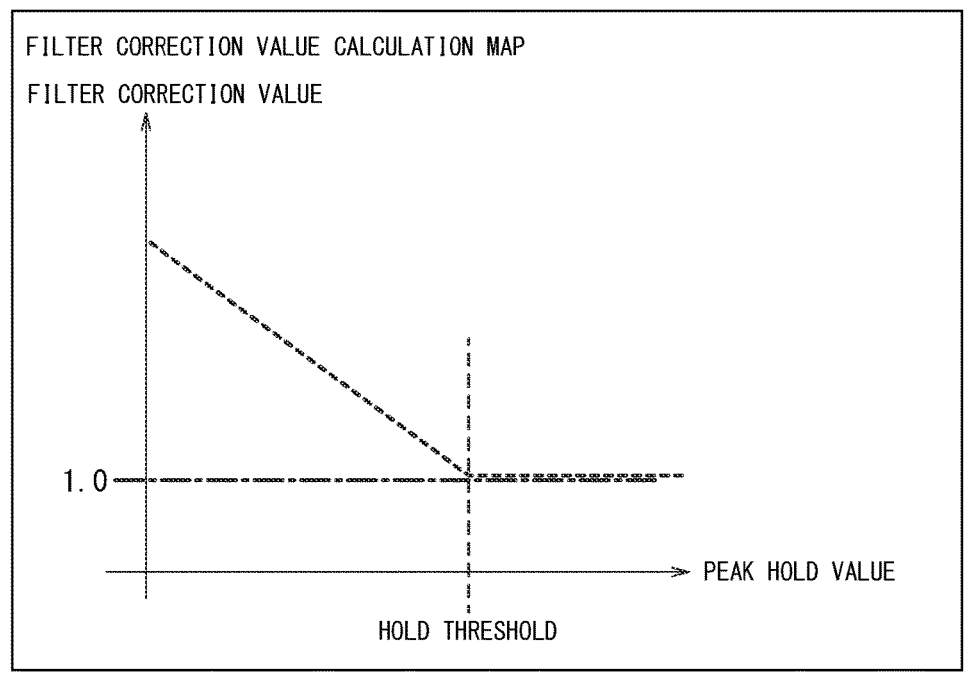
FIG. 7 is a drawing illustrating a filter correction value calculation map.

The filter correction value calculation map, is as illustrated in FIG. 7, a map indicating a relationship between a peak hold value and a filter correction value. Further, as illustrated in FIG. 7, the filter correction value calculation map is set in advance such that when the peak hold value exceeds a hold threshold that is a threshold value set in advance, the filter correction value becomes "1.0".

The peak hold value is the peak hold upper limit value or the peak hold lower limit value included in the processed peak hold value signal.

As illustrated in FIG. 7, when the peak hold value is equal to or less than the hold threshold, the filter correction value changes depending on the change of the peak hold value. Specifically, when the peak hold value is equal to or less than the hold threshold, as the peak hold value decreases, the filter correction value decreases.

Therefore, when the driver override is established and also the peak hold value is equal to or less than the hold threshold, as the speed difference obtained by subtracting the set speed from the current travelling speed of the vehicle C is large, the filter correction value takes a large value.

On the other hand, when the driver override is established and also the peak hold value exceeds the hold threshold, the filter correction value is a fixed value, i.e., "1.0".

In other words, when a speed difference obtained by subtracting the set speed from the current travelling speed of the vehicle C is small, or when the current travelling speed of the vehicle C is equal to or less than the set speed, the filter correction value is the fixed value, i.e., is "1.0".

Further, the filter correction value calculation unit 34 inputs the peak hold value to the filter correction value calculation map to calculate the filter correction value.

The filter correction value calculation unit 34 that has calculated the filter correction value outputs an information signal including the calculated filter correction value (hereinafter sometimes referred to as "filter correction value signal") to the ITS output setting unit 26.

(Detailed Configurations of ITS Output Setting Unit 26)

Figure 8:
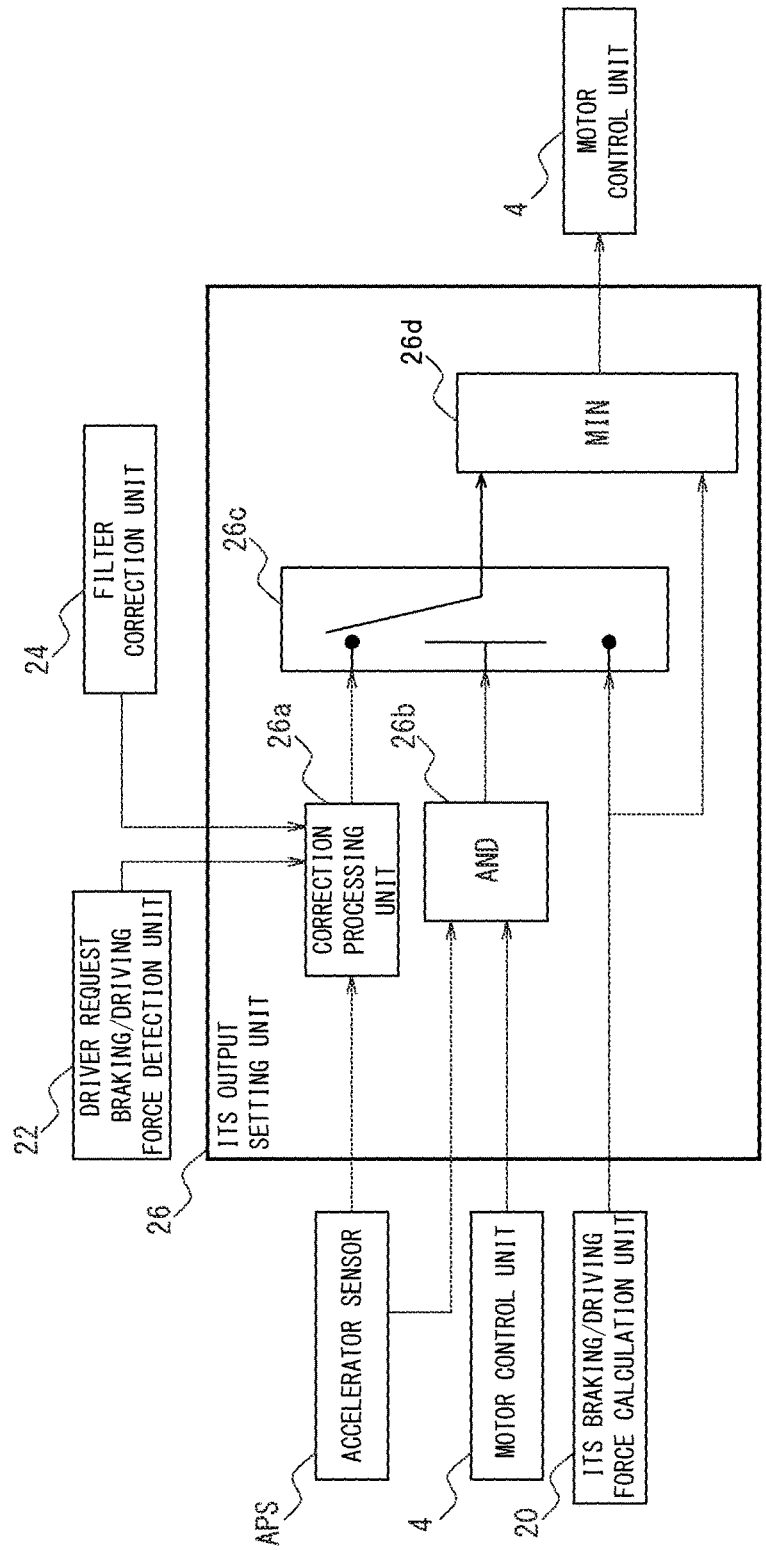
FIG. 8 is a block diagram illustrating configuration of an ITS output setting unit.

The ITS output setting unit 26, as illustrated in FIG. 8, includes a correction processing unit 26a, a determination condition addition unit 26b, a braking/driving force value switching unit 26c, and a minimum value selection unit 26d.

The correction processing unit 26a receives, from a driver request driving force detection unit 22, the driver request driving force signal or the driver request braking force signal and receives, from the filter correction unit 24, the filter correction value signal. Additionally, the correction processing unit 26a receives, from the accelerator sensor APS, an information signal including the operation amount of the accelerator pedal AP.

The correction processing unit 26a conducts the filter processing using the filter correction value included in the filter correction value signal to the driver request driving force or the driver request braking force using the operation amount of the accelerator pedal AP.

Detailed descriptions of the filter process conducted by the correction processing unit 26a are given below.

First, by referring to the operation amount of the accelerator pedal AP for each period of the sampling period set in advance, the change in the operation amount of the accelerator pedal AP is detected for each period of the sampling period.

When the operation amount of the accelerator pedal AP increases compared one period before (increasing), using the filter having a normal time constant set in advance, filter processes are conducted on the driver request driving force or the driver request braking force. Accordingly, when the operation amount of the accelerator pedal AP increases, the braking force decreases or the driving force increases depending on the increase in the operation amount of the accelerator pedal AP. Note that the normal time constant is set based on, for example, a weight of the vehicle C, a performance of the driving motor DM and the like.

On the other hand, when the operation amount of the accelerator pedal AP decreases compared one period before (decreasing), filter processes are conducted using the filter having the normal time constant and the filter correction value included in the filter correction value signal.

Specifically, when the operation amount of the accelerator pedal AP decreases, the filter processes are conducted to the driver request driving force or the driver request braking force using the filter (correction time constant filter) having a time constant (corrected time constant) that is obtained by multiplying the normal time constant by the filter correction value.

The correction processing unit 26a that has conducted the filter process outputs an information signal including the braking force or the driving force subjected to the filter process (hereinafter sometimes referred to as "filtered braking/driving force signal") to the braking/driving force value switching unit 26c.

Accordingly, in the filter processes conducted by the correction processing unit 26a, a transfer function between the operation to a decreasing direction of the accelerator pedal AP and the change in the braking/driving force (braking force and driving force) is changed to a direction in which the change in the braking/driving force is delayed. For example, the process is conducted by setting the change amount of the driving force and the braking force depending on the operation to the decreasing direction of the accelerator pedal AP by the driver to be smaller than the change amount of the driving force and the braking force depending on the operation to an increasing direction of the accelerator pedal AP by the driver.

In other words, in the filter processes conducted by the correction processing unit 26a, based on the override amount, a decrease rate of the driver demand torque depending on the decrease in the operation amount of the accelerator pedal AP is changed.

The determination condition addition unit 26b receives, from the accelerator sensor APS, an information signal including the operation amount of the accelerator pedal AP. Additionally, the determination condition addition unit 26b receives, from the motor control unit 4, the Dr override determination signal.

The determination condition addition unit 26b outputs a first switching signal to the braking/driving force value switching unit 26c when the operation amount of the accelerator pedal AP exceeds zero and when the Dr override determination signal includes a determination result that the driver override is established. On the other hand, the determination condition addition unit 26b outputs a second switching signal to the braking/driving force value switching unit 26c when the operation amount of the accelerator pedal AP is zero and when the Dr override determination signal includes a determination result that the driver override is not established.

Note that the first switching signal and the second switching signal are command signals of the processes conducted by the braking/driving force value switching unit 26c.

The braking/driving force value switching unit 26c is formed using, for example, a switching circuit. Further, the braking/driving force value switching unit 26c can switch a state between a state in which the correction processing unit 26a is connected with the minimum value selection unit 26d and a state in which the ITS braking/driving force calculation unit 20 is connected with the minimum value selection unit 26d.

The braking/driving force value switching unit 26c refers to the command signals that are received form the determination condition addition unit 26b. When the first switching signal is received from the determination condition addition unit 26b, the braking/driving force value switching unit 26c connects the correction processing unit 26a with the minimum value selection unit 26d. On the other hand, when the second switching signal is received from the determination condition addition unit 26b, the braking/driving force value switching unit 26c connects the ITS braking/driving force calculation unit 20 with the minimum value selection unit 26d.

The braking/driving force value switching unit 26c that has switched the connection states outputs the filtered braking/driving force signal or the ITS braking/driving force signal to the minimum value selection unit 26d.

Note that FIG. 8 illustrates that the braking/driving force value switching unit 26c switches a state to a state in which the correction processing unit 26a is connected with the minimum value selection unit 26d.

The minimum value selection unit 26d receives, from the braking/driving force value switching unit 26c, information signals (filtered braking/driving force signal or the ITS braking/driving force signal) and receives, from the ITS braking/driving force calculation unit 20, the ITS braking/driving force signal.

The minimum value selection unit 26d compares the braking force or the driving force included in the information signal received from the braking/driving force value switching unit 26c and the braking force or the driving force included in the ITS braking/driving force signal, and from between both, a braking force or a driving force of a minimum value (MIN) is selected (select-low).

In other words, when the information signal received from the braking/driving force value switching unit 26c includes a braking force and also the ITS braking/driving force signal includes a braking force, from between both of the braking forces, a smaller braking force is selected. On the other hand, when the information signal received from the braking/driving force value switching unit 26c includes a driving force and the ITS braking/driving force signal also includes a driving force, from between both of the driving forces, a smaller driving force is selected.

The minimum value selection unit 26d that has selected the braking force or the driving force of a minimum value outputs an information signal including the braking force or the driving force of the minimum value (hereinafter sometimes referred to as "minimum braking/driving force signal") to the motor control unit 4.

Accordingly, when the braking/driving force value switching unit 26c receives the second switching signal, the minimum value selection unit 26d receives only the ITS braking/driving force signal that is output from the ITS braking/driving force calculation unit 20. Thus, the minimum braking/driving force signal is the braking force or the driving force included in the ITS braking/driving force signal.

(Detailed Configurations of Motor Control Unit 4)

Figure 9:
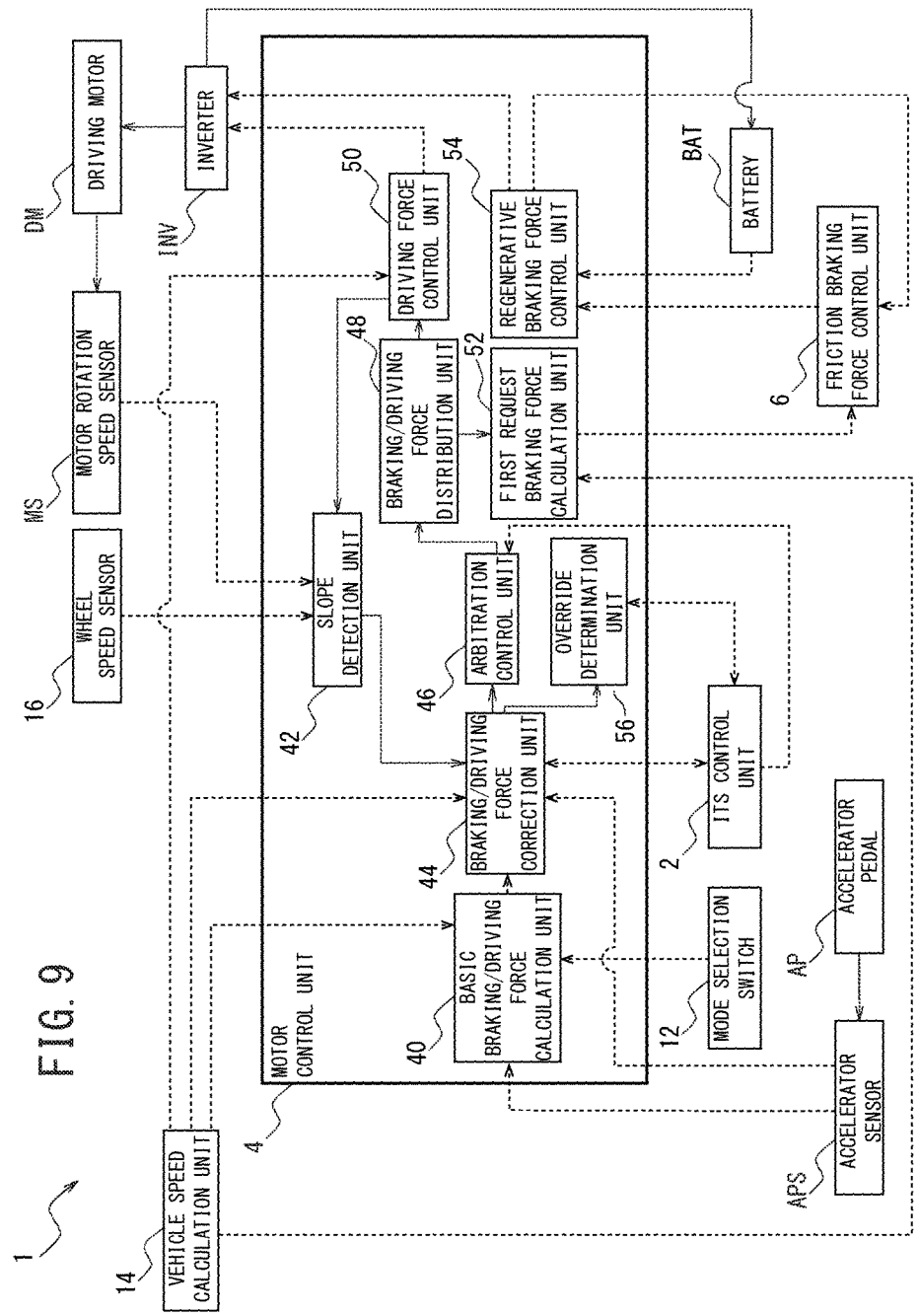
FIG. 9 is a block diagram illustrating a configuration of a motor control unit.

The motor control unit 4, as illustrated in FIG. 9, includes a basic braking/driving force calculation unit 40, a slope detection unit 42, and a braking/driving force correction unit 44. Additionally, the motor control unit 4 includes an arbitration control unit 46, a braking/driving force distribution unit 48, a driving force control unit 50, a first request braking force calculation unit 52, a regenerative braking force control unit 54, and an override determination unit 56.

The basic braking/driving force calculation unit 40 stores in advance the braking/driving force map.

Figure 10:
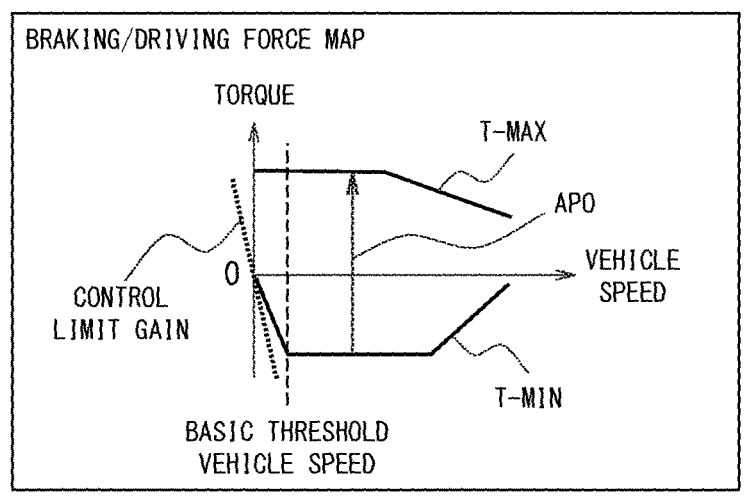
FIG. 10 is a drawing illustrating a braking/driving force map.

The braking/driving force map is, as illustrated in FIG. 10, for example, a map indicating a relationship among the vehicle speed, the operation amount (opening degree) of the accelerator pedal AP, and the torques (driving torque, braking torque) generated to the vehicle C.

The braking/driving force map illustrated in FIG. 10 is set in advance such that the driving torque and the braking torque have braking/driving force values set in advance when following conditions A1 to A3 are established.

A1. A road surface slope is within a slope range set in advance including zero (0°).

A2. The operation amount of the accelerator pedal AP is equal to or less than a stop threshold operation amount.

A3. The vehicle speed is equal to or less than a stop threshold vehicle speed set in advance.

In the first embodiment, as one example, a slope range is set to be a slope range when the traveling road surface is flat (for example, with a slope zero (0°) as a reference, a range from +0.5° to −0.5°). Further, in the first embodiment, as one example, a case where the braking/driving force value is set to zero is described.

In the first embodiment, as one example, a case where the stop threshold operation amount is set to zero is described. Further, in the first embodiment, as one example, a case where the stop threshold vehicle speed is set to zero (0 [km/h], the same applies to the following descriptions) is described.

Therefore, in the first embodiment, the braking/driving force map illustrated in FIG. 10 is set in advance such that when the traveling road surface is flat and when the operation amount of the accelerator pedal AP and the vehicle speed are zero, the driving torque and the braking torque are zero (0 [N·m]).

Note that in FIG. 10, the operation amount (opening degree) of the accelerator pedal AP is denoted with a reference numeral "APO". In FIG. 10, in a state where the operation amount of the accelerator pedal AP is a minimum value (unoperated), the torque generated depending on the vehicle speed is denoted with a reference numeral "T-MIN". Further, in FIG. 10, in a state where the operation amount of the accelerator pedal AP is a maximum value (pedaling operation amount is maximum), the torque generated depending on the vehicle speed is denoted with a reference numeral "T-MAX".

In FIG. 10, the driving torque and the braking torque are represented on a longitudinal axis with "0" as a border line. In the braking/driving force map illustrated in FIG. 10, the torque denoted with "T-MIN" is the braking torque. Further, in the braking/driving force map illustrated in FIG. 10, the torque denoted with "T-MAX" is the driving torque.

Further, the "basic threshold vehicle speed" illustrated in FIG. 10, in a state where the operation amount of the accelerator pedal AP is a minimum value (unoperated), corresponds to a border line between an area in which the torque generated depending on the vehicle speed decreases (change area) and an area in which the torque generated depending on the vehicle speed is constant (fixed area).

The basic braking/driving force calculation unit 40 receives, from the accelerator sensor APS, the information signal including the braking/driving force operation amount. Additionally, the basic braking/driving force calculation unit 40 receives, from the vehicle speed calculation unit 14, the vehicle speed signal.

Further, the basic braking/driving force calculation unit 40 receives, from the mode selection switch 12, the select mode signal. Note that a case where a control mode included in the select mode signal is the "one pedal mode" is described below.

The basic braking/driving force calculation unit 40 inputs the operation amount of the accelerator pedal AP and the vehicle speed to the braking/driving force map to calculate a target value of the driving torque generated to the vehicle C (target driving torque) or a target value of the braking torque (target braking torque). Note that the target driving torque and the target braking torque calculated by the basic braking/driving force calculation unit 40 are the target driving torque and the target braking torque when the vehicle C travels on the flat road surface (flat traveling). The target driving torque is a torque corresponding to the basic driving force and the target braking torque is a torque corresponding to the basic braking force.

In other words, the basic braking/driving force calculation unit 40 inputs the operation amount of the accelerator pedal AP and the vehicle speed to the braking/driving force map to set the basic braking force and the basic driving force.

Accordingly, the braking/driving force map illustrated in FIG. 10 includes a change area in which as the vehicle speed decreases (approach zero), the basic braking force decreases. In other words, the braking/driving force map illustrated in FIG. 10 is set in advance such that when the traveling road surface is flat, and if the operation amount of the accelerator pedal AP is zero and the travelling speed is zero, the basic braking force and the basic driving force are zero.

According to the braking/driving force map illustrated in FIG. 10, when the operation amount of the accelerator pedal AP is equal to or less than the stop threshold operation amount (zero in first embodiment), the braking force for stopping the vehicle C is generated.

In other words, the basic braking/driving force calculation unit 40, depending on the operation amount of the accelerator pedal AP and the vehicle speed, calculates the basic braking force and the basic driving force.

Specifically, when the operation amount of the accelerator pedal AP is less than a threshold value set in advance (braking/driving force switching operation amount), the basic braking force depending on the operation amount of the accelerator pedal AP that is less than the threshold value and the travelling speed when the traveling road surface is flat is calculated. On the other hand, when the operation amount of the accelerator pedal AP is equal to or larger than the threshold value, the basic driving force depending on the operation amount of the accelerator pedal AP that is equal to or larger than the threshold value and the travelling speed when the traveling road surface is flat is calculated.

Accordingly, the basic braking/driving force calculation unit 40 inputs, to the braking/driving force map, the operation amount of the accelerator pedal AP and the vehicle speed to calculate the basic braking force and the basic driving force.

Further, the basic braking/driving force calculation unit 40, when the road surface slope is within the slope range (traveling road surface is flat), sets the braking force generated to the vehicle C to the basic braking force set in advance or sets the driving force generated to the vehicle C to the basic driving force set in advance.

The basic braking/driving force calculation unit 40 that has calculated the target driving torque outputs an information signal including the calculated target driving torque (hereinafter sometimes referred to as "basic drive torque signal") to the braking/driving force correction unit 44.

The basic braking/driving force calculation unit 40 that has calculated the target braking torque outputs an information signal including the calculated target braking torque (hereinafter sometimes referred to as "basic braking torque signal") to the braking/driving force correction unit 44.

A "control limit gain" represented in the braking/driving force map is described in details.

When the braking/driving force control device 1 is a system including an element of a response lag, in FIG. 10, if a slope of the line represented by "control limit gain" is increased too much (increase inclination angle too much), the hunting may be caused to the current command value of the driving motor DM (motor). This is because as the inclination angle of the line represented by control limit gain relative to the longitudinal axis representing the torque increases, the degree of change of the deceleration relative to the change in the vehicle speed increases.

Note that the "response lag" means that by the increase of the degree of change of the deceleration relative to the change in the vehicle speed, the change in the vehicle speed may not follow the sharp change in the deceleration depending on the regenerative braking force and the change in the vehicle speed is delayed relative to the change in the deceleration depending on the regenerative braking force.

When the hunting is caused to the current command value, the variation of the braking force that is different from the driver's request is generated to the decelerating vehicle C and the variation of the vehicle speed that is different from the driver's request is generated.

The hunting caused to the current command value is generated based on following elements (1. to 6.) for example, in a state where the vehicle C is decelerated while travelling the road surface having a descending slope when the deceleration depending on the regenerative braking force is determined using the braking/driving force map.
1. Since the traveling road surface has the descending slope, the vehicle speed increases.
2. As the vehicle speed increases, the deceleration depending on the regenerative braking force increases.
3. Since the deceleration depending on the regenerative braking force increases, the vehicle speed decreases.
4. Since the vehicle speed decreases, the deceleration depending on the regenerative braking force decreases.
5. Since the deceleration depending on the regenerative braking force decreases, the vehicle speed decreases.
6. By repeating the above elements 2 to 5, the hunting is caused to the current command value.

If the slope of the line represented by the control limit gain is gentle (if inclination angle is small), relative to the change in the vehicle speed, the deceleration depending on the regenerative braking force does not sharply increase or decrease. Thus, relative to the change in the deceleration depending on the regenerative braking force, the occurrence of the phase lag of the change in the vehicle speed is suppressed and it is possible to suppress the hunting caused to the current command value. In other words, by making small the inclination angle of the line represented by control limit gain, it is possible to stabilize the control of the current command value.

From the above, the border line between a state where the control of the current command value is stable and a state where the control of the current command value is unstable corresponds to the line represented by the control limit gain in FIG. 10. In other words, the line represented by control limit gain in FIG. 10 is an upper limit of the degree of change of the regenerative braking force depending on the vehicle speed of the vehicle C. The inclination angle of the line represented by control limit gain in FIG. 10 is set based on, for example, the performance of the driving motor DM (capability to generate regenerative braking force), the weight of the vehicle C and the like. In other words, the control limit gain illustrated in FIG. 10 is the upper limit of the degree of change of the deceleration depending on the regenerative braking force (basic braking force) relative to the vehicle speed in which the change in the vehicle speed calculated by the vehicle speed calculation unit 14 can follow the change in the deceleration depending on the regenerative braking force (basic braking force).

Accordingly, in the region not greater than the basic threshold vehicle speed of the braking/driving force map, the degree of change of the torque represented by "T-MIN" relative to the change in the vehicle speed calculated by the vehicle speed calculation unit 14 is equal to or less than the control limit gain. In other words, in the region not greater than the basic threshold vehicle speed in the braking/driving force map, the degree of change of the minimum value of the torque relative to the change in the vehicle speed calculated by the vehicle speed calculation unit 14 is equal to or less than the control limit gain.

Further, in the braking/driving force map illustrated in FIG. 10, the degree of change of the basic braking force depending on the change of the vehicle speed in the change area is equal to or less than the control limit gain that is the degree of change set in advance.

The slope detection unit 42 stores in advance a relationship between the driving torque to be generated for a flatland (flat road) and the revolution speed of the wheel as a reference (flatland reference). Note that a relationship between the driving torque to be generated for the flat road and the revolution speed of the wheel is, for example, calculated using the test road surface formed to a slope within the rage corresponding to the flat road, and the slope detection unit 42 stores the relationship as the flatland reference.

The slope detection unit 42 receives, from the driving force control unit 50, a driving torque signal including the driving current command value and receives, from the wheel speed sensor 16, the wheel speed signal including the revolution speed of the wheel. Further, the slope detection unit 42 receives, from the motor rotation speed sensor MS, the output shaft rotation speed signal.

The output shaft rotation speed signal is an information signal including the rotation speed of the motor driving force output shaft (not illustrated) of the driving motor DM.

Note that descriptions of the driving torque signal and the output shaft rotation speed signal are given later.

The slope detection unit 42 calculates a relationship between the current driving torque that is calculated using the current command value and the revolution speed of the wheel W (current relationship). Further, the magnitude of the road surface slope is detected using the degree of deviation between the calculated current relationship and the flatland reference stored by the slope detection unit 42.

For example, when the revolution speed of the wheel W relative to the driving torque is slower than the flatland reference, it is determined that the road surface slope is the upward slope. Additionally, as the revolution speed of the wheel W is slow, the upward slope is detected as the large upward slope.

On the other hand, when the revolution speed of the wheel W relative to the driving torque is faster than the flatland reference, the road surface slope is determined to be the descending slope. Additionally, as the revolution speed of the wheel W is fast, the descending slop is detected as the large descending slop.

Accordingly, the slope detection unit 42 detects a direction of road surface slope along which the vehicle C travels and the magnitude of the road surface slope.

In other words, the slope detection unit 42 determines whether or not the direction of the road surface slope along which the vehicle C travels is an upstream direction or a downward direction.

The slope detection unit 42 that has detected the direction and the magnitude of the road surface slope outputs an information signal including the detected direction and magnitude of the slope (hereinafter sometimes referred to as "road surface slope signal") to the braking/driving force correction unit 44.

The braking/driving force correction unit 44 receives information signals from the accelerator sensor APS, the basic braking/driving force calculation unit 40, the slope detection unit 42, the vehicle speed calculation unit 14, and the ITS control unit 2.

Then the braking/driving force correction unit 44 corrects the target driving torque of the flat traveling included in the basic drive torque signal or the target braking torque of the flat traveling included in the basic braking torque signal using various received information signals.

The braking/driving force correction unit 44 that has corrected the target driving torque of the flat traveling included in the basic drive torque signal outputs the corrected driving force signal to the arbitration control unit 46 as an information signal including the driving force (corrected driving force) depending on the corrected driving torque. Additionally, the braking/driving force correction unit 44 outputs the corrected driving force signal to the override determination unit 56 and the driver request braking/driving force detection unit 22.

The braking/driving force correction unit 44 that has corrected the target braking torque of the flat traveling included in the basic drive torque signal outputs the corrected braking force signal to the arbitration control unit 46 as an information signal including the braking force (corrected braking force) depending on the corrected braking torque. Additionally, the braking/driving force correction unit 44 outputs the corrected braking force signal to the override determination unit 56 and the driver request braking/driving force detection unit 22.

In other words, the braking/driving force correction unit 44, when the traveling road surface is not flat, depending on the direction and the magnitude of the slope, corrects the basic braking force to calculate the corrected braking force and sets the braking force of the vehicle C to the corrected braking force. Further, the braking/driving force correction unit 44, when the traveling road surface is not flat, depending on the direction and the magnitude of the slope, corrects the basic driving force to calculate the corrected driving force and sets the driving force of the vehicle C to the corrected driving force.

The braking/driving force correction unit 44 corrects the basic braking force or the basic driving force depending on the direction of the road surface slope and the magnitude of the slope and then calculates the corrected braking force or the corrected driving force. Further, the braking/driving force correction unit 44 sets the corrected braking force or the corrected driving force such that when the operation amount of the accelerator pedal AP is less than the threshold value, the braking force (deceleration) is caused to the vehicle C and alternatively when the operation amount of the accelerator pedal AP is equal to or larger than the threshold value, the driving force (acceleration) is caused to the vehicle C.

The braking/driving force correction unit 44 corrects the basic braking force and the basic driving force calculated by the braking/driving force map depending on a balance torque by continuously increasing or decreasing the basic braking force and the basic driving force.

Note that the balance torque is a torque enabling the vehicle C to maintain the stopped state on the traveling road surface. Further, the balance torque is calculated based on, for example, the weight of the vehicle C, the capability to generate the driving force, the capability to generate the regenerative braking force, and the capability to generate the friction braking force.

The braking/driving force correction unit 44 corrects the basic braking force depending on the direction of the road surface slope and the magnitude of the slope and sets the corrected braking force. Further, the braking/driving force correction unit 44 corrects the basic driving force depending on the direction of the road surface slope and the magnitude of the slope and sets the corrected driving force.

Specifically, the slope detection unit 42 determines that the direction of the road surface slope is the upstream direction and when the magnitude of the slope detected by the slope detection unit 42 increases in the upstream direction, the slope detection unit 42 sets the braking force generated to the vehicle C to the corrected braking force that is obtained by correcting and decreasing the basic braking force depending on the magnitude of the slope. Further, the slope detection unit 42 sets the driving force generated to the vehicle C to the corrected driving force that is obtained by correcting and increasing the basic driving force depending on the magnitude of the slope.

On the other hand, the slope detection unit 42 determines that the direction of the road surface slope is the downward direction and when the magnitude of the slope detected by the slope detection unit 42 increases in the downward direction, the slope detection unit 42 sets the braking force generated to the vehicle C to the corrected braking force that is obtained by correcting and increasing the basic braking force based on the magnitude of the slope. Further, the slope detection unit 42 sets the driving force generated to the vehicle C to the corrected driving force that is obtained by correcting and decreasing the basic driving force based on the magnitude of the slope.

Note that a state where the direction of the road surface slope increases in the upstream direction includes a state where the traveling road surface changes from the flat road to an uphill and a state where the traveling road surface changes from the uphill to an uphill having a larger slope in the upstream direction. Additionally, a state where the direction of the road surface slope increases in the upstream direction includes a state where the traveling road surface changes from the downhill to a downhill having a smaller slope in the downstream direction.

Further, a state where the direction of the road surface slope increases in the downward direction includes a state where the traveling road surface changes from the flat road to a downhill and a state where the traveling road surface changes from the downhill to a downhill having a larger slope in the downward direction. Additionally, a state where the direction of the road surface slope increases in the downward direction includes a state where the traveling road surface changes from the uphill to the uphill having a smaller slope in the upward direction.

The arbitration control unit 46 receives the corrected driving force signal or the corrected braking force signal, and the corrected ITS output signal.

The arbitration control unit 46 compares a parameter subjected to the filter process by the ITS output setting unit 26 with a parameter included in the corrected driving force signal and selects the driving force or the braking force to be output to the braking/driving force distribution unit 48.

Specifically, when the corrected ITS braking/driving force including the driving force is received from the ITS output setting unit 26 and the corrected driving force signal is received from the braking/driving force correction unit 44, the arbitration control unit 46 compares the driving force included in the corrected driving force signal with the driving force included in the corrected ITS braking/driving force. The arbitration control unit 46, from between both of the driving forces, selects a larger driving force (select-high) and outputs an information signal including the selected driving force (hereinafter sometimes referred to as "arbitration driving force signal") to the braking/driving force distribution unit 48.

On the other hand, when the corrected ITS braking/driving force including the braking force is received from the ITS output setting unit 26 and the corrected braking force signal is received from the braking/driving force correction unit 44, the arbitration control unit 46 compares the braking force included in the corrected braking force signal with the braking force included in the corrected ITS braking/driving force. The arbitration control unit 46, from between both of the braking forces, selects a larger braking force (select-high) and outputs an information signal including the selected braking force (hereinafter sometimes referred to as "arbitration braking force signal") to the braking/driving force distribution unit 48.

When the braking/driving force distribution unit 48 receives, from the arbitration control unit 46, the arbitration driving force signal, the braking/driving force distribution unit 48 outputs an information signal similar to the arbitration driving force signal (hereinafter sometimes referred to as "driving force distribution signal") to the driving force control unit 50.

When the braking/driving force distribution unit 48 receives, from the arbitration control unit 46, the arbitration braking force signal, the braking/driving force distribution unit 48 outputs an information signal similar to the arbitration braking force signal (hereinafter sometimes referred to as "braking force distribution signal") to the first request braking force calculation unit 52.

The driving force control unit 50 receives information signals from the braking/driving force distribution unit 48 and the vehicle speed calculation unit 14. The driving force control unit 50 refers to the driving force included in the driving force distribution signal and the vehicle speed included in the vehicle speed signal and calculates the driving current command value.

The driving current command value is a current command value for generating, at the driving motor DM, the driving torque depending on the driving force included in the driving force distribution signal.

The driving force control unit 50 outputs an information signal including the calculated driving current command value (hereinafter sometimes referred to as "driving torque signal") to the slope detection unit 42 and an inverter INV.

Figure 11:
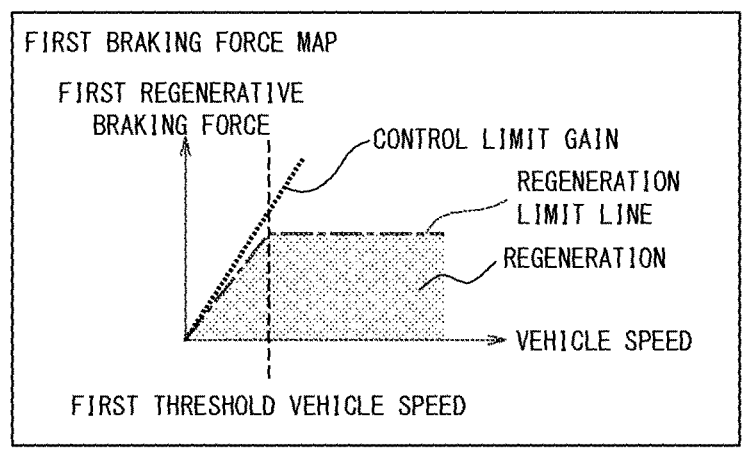
FIG. 11 is a drawing illustrating a first braking force map.

The first request braking force calculation unit 52 stores in advance the first braking force map illustrated in FIG. 11.

The first braking force map is a map indicating the regenerative braking force generated depending on the vehicle speed and the deceleration depending on the regenerative braking force.

Note that the "regeneration" illustrated in FIG. 11 is a region corresponding to the regenerative braking force. The "regeneration limit line" illustrated in FIG. 11 is a line representing the upper limit of the regenerative braking force depending on the vehicle speed. Further, the "first threshold vehicle speed" in FIG. 11 corresponds to the border line between the change area in which the upper limit of the regenerative braking force changes depending on the change in the vehicle speed and the fixed area in which the upper limit of the regenerative braking force is constant. Note that the first threshold vehicle speed is set to, for example, 10 [km/h]. Accordingly, the change area in the first braking force map is an area in which the request value (request) of the regenerative braking force changes relative to the change in the vehicle speed calculated by the vehicle speed calculation unit 14.

In other words, the first braking force map is a map for determining the regenerative braking force (regeneration amount) generated at the driving motor DM by feeding back the vehicle speed calculated by the vehicle speed calculation unit 14. Accordingly, the first braking force map indicates that when the vehicle speed changes, the deceleration changes also.

Further, as illustrated in FIG. 11, the regeneration limit line is values for generating the regenerative braking force for stopping the vehicle C when the traveling road surface on which the vehicle C travels is flat (flat road) and only when the vehicle C travels, i.e., the vehicle speed exceeds "0 [km/h]". Accordingly, the regeneration limit line used for the flat traveling in FIG. 11 is a line representing the upper limit of the regenerative braking force depending on the vehicle speed in a state where the vehicle speed is "0 [km/h]" and the deceleration and the regenerative braking force are zero.

The first request braking force calculation unit 52 refers to the corrected braking force included in the braking force distribution signal that is received from the braking/driving force distribution unit 48 and the vehicle speed included in the vehicle speed signal that is received from the vehicle speed calculation unit 14 and calculates the deceleration generated to the vehicle C. The first request braking force calculation unit 52 calculates the first regenerative braking force as the regenerative braking force depending on the calculated deceleration, and outputs an information signal including the first regenerative braking force (hereinafter sometimes referred to as "first braking request signal") to the friction braking force control unit 6.

Specifically, to the first braking force map illustrated in FIG. 11, the vehicle speed included in the vehicle speed signal and the corrected braking force included in the braking force distribution signal are fed back and the first regenerative braking force is calculated.

In other words, the first request braking force calculation unit 52 calculates the first regenerative braking force depending on the corrected braking force obtained by correcting the basic braking force based on the direction of the road surface slope and the magnitude of the slope.

The operation amount of the accelerator pedal AP that is equal to or less than the braking/driving force switching operation amount corresponds to the operation amount of the accelerator pedal AP that is less than the threshold value set in advance.

Accordingly, the first request braking force calculation unit 52 calculates the first regenerative braking force (request value of regenerative braking force) depending on the operation amount of the accelerator pedal AP that is equal to or less than the braking/driving force switching operation amount (i.e. less than the threshold value set in advance) and the travelling speed of the vehicle C.

The first request braking force calculation unit 52 calculates the first regenerative braking force with the regeneration limit line as the upper limit such that when the operation amount of the accelerator pedal AP detected by the accelerator sensor APS is within the braking range, until the vehicle C is stopped, the vehicle speed calculated by the vehicle speed calculation unit 14 decreases. In other words, the first request braking force calculation unit 52 calculates the regenerative braking force for stopping the vehicle C depending on the operation amount of the accelerator pedal AP when the operation amount of the accelerator pedal AP is equal to or less than the braking/driving force switching operation amount.

The regenerative braking force control unit 54 receives, from the friction braking force control unit 6, the regeneration request value signal. Additionally, from a battery BAT, a current State Of Charge (SOC) is acquired. The regenerative braking force control unit 54 refers to the request value of regenerative braking force included in the regeneration request value signal and the current state of charge of the battery BAT and calculates the regenerative execution amount.

A regenerative request amount is a target value of the regenerative braking force generated to the driving motor DM.

The regenerative execution amount is the regenerative braking force that is actually generated at the driving motor DM.

If the current state of charge is close to a full charge and it is not possible to charge the power generated by the regenerative braking to the battery BAT, the calculation is made by assuming that the regenerative execution amount is zero. Alternatively, when it is possible to charge the power generated by the regenerative braking to the battery BAT, the calculation is made by assuming that the regenerative request amount is equal to the regenerative execution amount (regenerative request amount=regenerative execution amount).

The regenerative braking force control unit 54 that has calculated the regenerative execution amount calculates the regenerative current command value.

The regenerative current command value is a current command value for generating the regenerative torque by the driving motor DM depending on the regenerative execution amount.

The regenerative braking force control unit 54 that has calculated the regenerative current command value outputs an information signal including the calculated regenerative current command value (hereinafter sometimes referred to as "regenerative torque signal") to the inverter INV and the friction braking force control unit 6.

Accordingly, the regenerative braking force control unit 54 generates, at the driving motor DM, the regenerative braking force depending on request value (request) of the regenerative braking force calculated by the friction braking force control unit 6. Note that the request value (request) of regenerative braking force calculated by the friction braking force control unit 6 is the request value (request) of regenerative braking force selected by a regenerative coordination control unit 64 described later.

The override determination unit 56 receives the corrected driving force signal or the corrected braking force signal, and the corrected ITS output signal.

Then, the override determination unit 56 determines whether or not the driver override is established based on the corrected ITS braking/driving force included in the corrected ITS output signal, the driving force included in the corrected driving force signal, and the braking force included in the corrected braking force signal. The override determination unit 56 that has determined whether or not the driver override is established outputs the Dr override determination signal as an information signal including the determination result to the filter correction unit 24 of the ITS control unit 2.

As described above, the driver override indicates a state where the driver of the vehicle C has the control right of the driving force or the braking force of the vehicle C. In other words, the driver override indicates a state where, for example, the driving force (driving force depending on operation amount of accelerator pedal AP) intended by the driver of the vehicle C is larger than the driving force selected by the ITS output setting unit 26.

Accordingly, when the driver override is established, the control of the braking/driving force by the ITS control unit 2 is stopped.

The determination as to whether or not the driver override is established is made by comparing the parameter subjected to the filter process by the ITS output setting unit 26 and the parameter included in the corrected driving force signal.

In other words, when the driving force included in the corrected driving force signal exceeds the driving force subjected to the filter process by the ITS output setting unit 26, the determination is made that the driver override is established. Further, when the braking force included in the corrected braking force signal exceeds the braking force subjected to the filter process by the ITS output setting unit 26, the determination is made that the driver override is established.

(Detailed Configuration of Friction Braking Force Control Unit 6)

Figure 12:
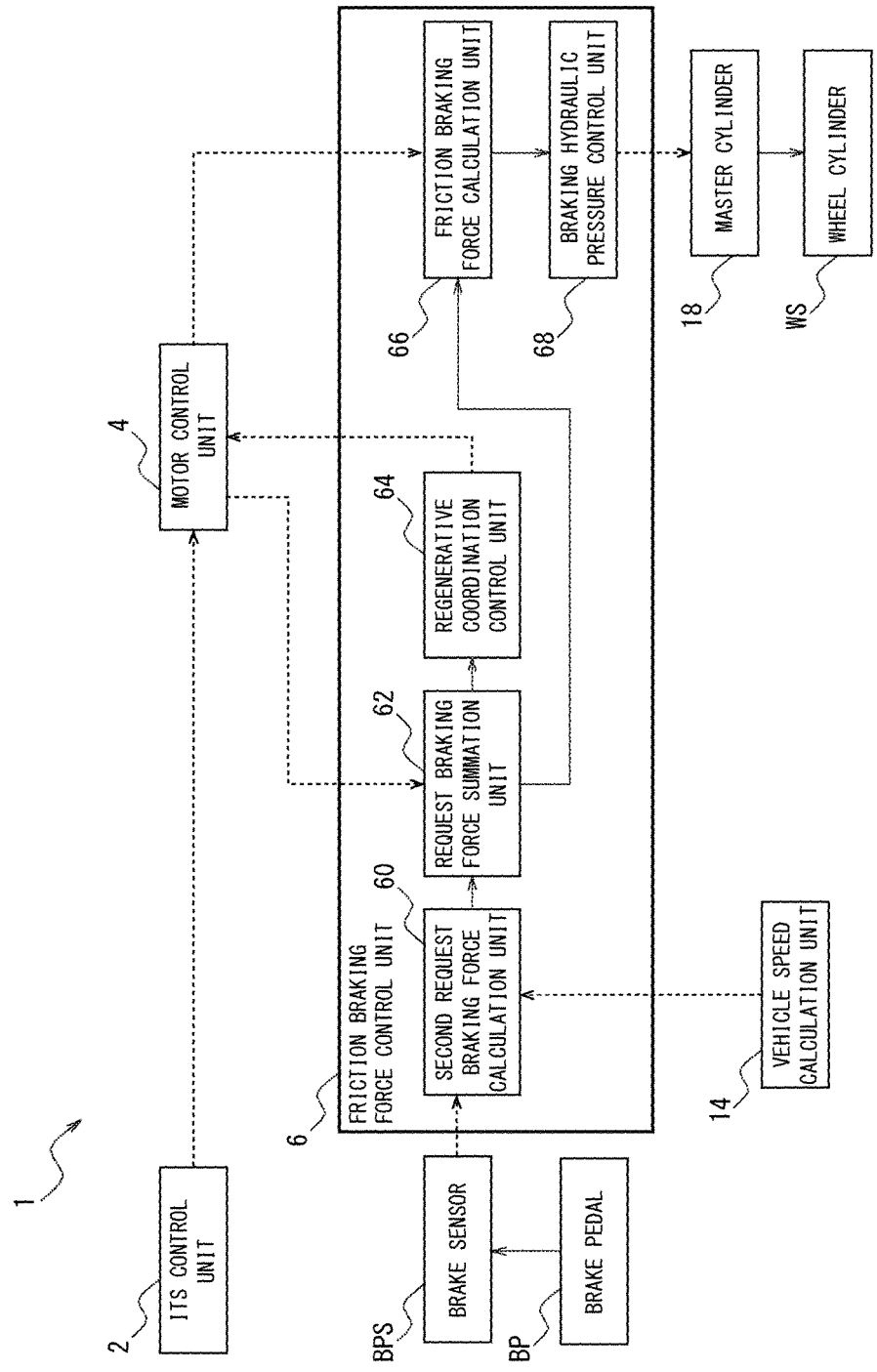
FIG. 12 is a block diagram illustrating a configuration of a friction braking force control unit.

The friction braking force control unit 6, as illustrated in FIG. 12, includes a second request braking force calculation unit 60, a request braking force summation unit 62, a regenerative coordination control unit 64, a friction braking force calculation unit 66, and a braking hydraulic pressure control unit 68.

The second request braking force calculation unit 60 receives, from the brake sensor BPS, an information signal including the operation amount of the brake pedal BP (braking force operation amount). Additionally, the second request braking force calculation unit 60 receives, from the vehicle speed calculation unit 14, the vehicle speed signal.

Note that the brake pedal BP is a pedal pedaled by the driver of the vehicle C only in response to the braking force request and is provided separately from the accelerator pedal AP.

Figure 13:
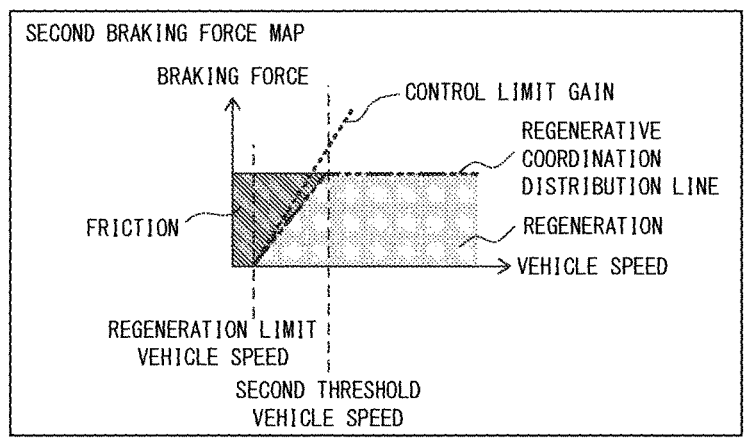
FIG. 13 is a drawing illustrating a second braking force map.

The second request braking force calculation unit 60 stores in advance a second braking force map illustrated in FIG. 13.

The second braking force map is a map indicating the braking force (regenerative braking force, friction braking force) that is generated depending on the operation amount of the brake pedal BP and the travelling speed (vehicle speed) of the vehicle C.

Note that the "regeneration" in FIG. 13 is the region corresponding to the regenerative braking force. Further, the "friction" in FIG. 13 is the region corresponding to the friction braking force. Further, the "regenerative coordination distribution line" in FIG. 13 is a line representing the upper limit of the regenerative braking force depending on the operation amount of the brake pedal BP and the vehicle speed.

The "second threshold vehicle speed" in FIG. 13 corresponds to a border line between the change area in which the upper limit of the regenerative braking force changes depending on the change in the vehicle speed and the fixed area in which the upper limit of the regenerative braking force is constant. Note that the second threshold vehicle speed is set to, for example, 10 [km/h]. Accordingly, the change area in the second braking force map is the area in which the request value of regenerative braking force changes relative to the change in the vehicle speed calculated by the vehicle speed calculation unit 14.

The "control limit gain" in FIG. 13 is the upper limit of the degree of change of the regenerative braking force depending on the vehicle speed not greater than the second threshold vehicle speed. Further, the line represented by control limit gain in FIG. 13, as similar to the line represented by the control limit gain in FIG. 11, corresponds to a border line between a state where the control of the current command value is stable and a state where the control of the current command value is unstable. In other words, the control limit gain in FIG. 13 is the upper limit of the degree of change of the deceleration depending on the regenerative braking force relative to the vehicle speed in which the change in the vehicle speed calculated by the vehicle speed calculation unit 14 can follow the change in the deceleration depending on the regenerative braking force.

Accordingly, in the change area of the second braking force map, the degree of change of the request value of regenerative braking force (deceleration depending on regenerative braking force) relative to the change in the vehicle speed calculated by the vehicle speed calculation unit 14 is equal to or less than the control limit gain.

The "regeneration limit vehicle speed" in FIG. 13 corresponds to the border line between the region in which the braking force depending on the operation amount of the brake pedal BP and the vehicle speed is generated only with the friction braking force and the region in which the braking force depending on the operation amount of the brake pedal BP and the vehicle speed is generated at least with the regenerative braking force out of the regenerative braking force and the friction braking force.

As illustrated in FIG. 13, the regeneration limit vehicle speed is set to a value for generating the braking force that depends on the operation amount of the brake pedal BP and the vehicle speed only with the friction braking force when the vehicle C decelerates and in a state where the vehicle speed is larger than zero, i.e., in a state before the travelling vehicle C stops. This is because in a state where the vehicle speed is equal to or less than the regeneration limit vehicle speed (for example, 3 [km/h]), the power consumed by the driving motor DM to generate the regenerative braking force exceeds the power generated by the regenerative braking force, as the entire vehicle, the energy efficiency is lowered.

To maintain the stopped state of the vehicle C (to maintain a state where vehicle speed is 0 [km/h]), the friction braking force is preferably used rather than using the regenerative braking force to have a good energy efficiency. Thus, when the brake pedal BP is operated and the stopped state of the vehicle C is maintained, only the friction braking force is generated.

Accordingly, the regenerative coordination distribution line is a value for generating the regenerative braking force only when the vehicle C is travelling.

The second request braking force calculation unit 60 refers to the operation amount of the brake pedal BP and the vehicle speed included in the vehicle speed signal and calculates a second braking request that is a request (request value) of the braking force depending on the operation amount of the brake pedal BP and the vehicle speed.

The second braking request includes at least one of the request values out of the request value of the regenerative braking force (second regenerative braking force) and the request value of the friction braking force that depend on the operation amount of the brake pedal BP and the vehicle speed.

The request values of the regenerative braking force and the friction braking force depending on the operation amount of the brake pedal BP and the vehicle speed are calculated by feeding back, to the second braking force map in FIG. 13, for example, the vehicle speed included in the vehicle speed signal and the braking force depending on the operation amount of the brake pedal BP. Note that when the vehicle speed included in the vehicle speed signal exceeds the second threshold vehicle speed, the calculation is made by assuming that the request value of the friction braking force is zero.

The second request braking force calculation unit 60 that has calculated the second braking request outputs an information signal including the second braking request (hereinafter sometimes referred to as "second braking request signal") to the request braking force summation unit 62.

Accordingly, when the brake pedal BP is operated, the second request braking force calculation unit 60 calculates the request value (request) of the regenerative braking force (second regenerative braking force) based on the operation amount of the brake pedal BP and the travelling speed of the vehicle C with the regenerative coordination distribution line as the upper limit. Additionally, when the brake pedal BP is operated, the second request braking force calculation unit 60 calculates the braking force exceeding the regenerative coordination distribution line as the request value (request) of the friction braking force based on the operation amount of the brake pedal BP and the travelling speed of the vehicle C.

Further, the second request braking force calculation unit 60 calculates the second braking request such that a portion of the braking forces depending on the operation amount of the brake pedal BP detected by the brake sensor BPS, the braking force exceeding the regenerative coordination distribution line is generated with the friction braking force.

The second request braking force calculation unit 60, only when the vehicle speed exceeds the regeneration limit vehicle speed, with the regenerative coordination distribution line as the upper limit, calculates the second regenerative braking force.

The request braking force summation unit 62 receives, from the first request braking force calculation unit 52 and the second request braking force calculation unit 60, information signals.

The request braking force summation unit 62 outputs an information signal including the first regenerative braking force (hereinafter sometimes referred to as "first regenerative signal") to the regenerative coordination control unit 64. Further, the request braking force summation unit 62, when the second braking request includes the second regenerative braking force, outputs an information signal including the second regenerative braking force (hereinafter sometimes referred to as "second regenerative signal") to the regenerative coordination control unit 64.

The request braking force summation unit 62 sums the first regenerative braking force included in the first braking request signal and the second braking request included in the second braking request signal. In other words, the request braking force summation unit 62 sums the first regenerative braking force calculated by the first request braking force calculation unit 52 and the second regenerative braking force and the friction braking force that are calculated by the second request braking force calculation unit 60.

The request braking force summation unit 62 that has summed each of the braking forces outputs an information signal including the request value (summation request braking force) of the summed braking force (hereinafter sometimes referred to as "sum braking force signal") to the friction braking force calculation unit 66.

The regenerative coordination control unit 64 receives, from the request braking force summation unit 62, either one of the first regenerative signal and the second regenerative signal.

The regenerative coordination control unit 64, using the summation request braking force included in the sum braking force signal, selects the request value (upper limit) of the regenerative braking force.

The regenerative coordination control unit 64 that has selected the request value of regenerative braking force outputs a regeneration request value signal that is an information signal including the selected request value to the regenerative braking force control unit 54.

Specifically, the regenerative coordination control unit 64 compares the first regenerative braking force included in the first regenerative signal with the second regenerative braking force included in the second regenerative signal and selects a larger regenerative braking force (select-high). Then, the regenerative coordination control unit 64 selects this regenerative braking force as the request value of regenerative braking force.

Figure 14:
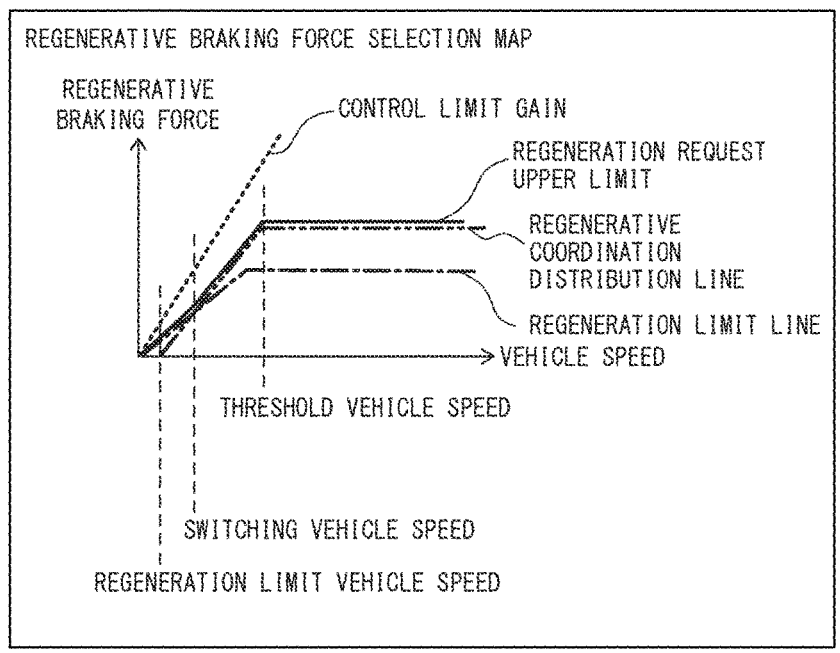
FIG. 14 is a drawing illustrating a regenerative braking force selection map.

In other words, when the regenerative coordination control unit 64 selects the request value of regenerative braking force, the regenerative coordination control unit 64 inputs to the map illustrated in FIG. 14, for example, the first regenerative braking force and the second regenerative braking force that depend on the identical vehicle speed. The regenerative coordination control unit 64 selects a larger regenerative braking force out of the first regenerative braking force and the second regenerative braking force.

The map (regenerative braking force selection map) illustrated in FIG. 14 is a map indicating a relationship among the first regenerative braking force, the second regenerative braking force, and the vehicle speed.

Note that the "regeneration limit line" illustrated in FIG. 14 is similar to the "regeneration limit line" illustrated in FIG. 11 and the "regenerative coordination distribution line" illustrated in FIG. 14 is similar to the "regenerative coordination distribution line" illustrated in FIG. 13.

The "regeneration request upper limit" illustrated in FIG. 14 is a line obtained by continuing values each of which is larger one among a value on the regeneration limit line and a value on the regenerative coordination distribution line at the same vehicle speed.

The "threshold vehicle speed" in FIG. 14 corresponds to the border line between the change area in which the upper limit of the regenerative braking force changes depending on the change in the vehicle speed and the fixed area in which the upper limit of the regenerative braking force is constant. Note that the threshold vehicle speed is, as similar to the first threshold vehicle speed and the second threshold vehicle speed, set to, for example, 10 [km/h].

The "control limit gain" illustrated in FIG. 14 is similar to the "control limit gain" illustrated in FIGS. 10, 11, and 13.

The "switching vehicle speed" illustrated in FIG. 14 corresponds to the border line between the region in which the regeneration request upper limit is the regeneration limit line and the region in which the regeneration request upper limit is the regenerative coordination distribution line. Further, the "regeneration limit vehicle speed" in FIG. 14 is similar to the "regeneration limit vehicle speed" in FIG. 13.

Note that the switching vehicle speed is set in advance based on, for example, the performance•specification (car weight, performance of driving motor DM and the like) of the vehicle C.

From the above, the regenerative coordination control unit 64, while decelerating, when the brake pedal BP is operated, selects a larger regenerative braking force out of the first regenerative braking force calculated by the first request braking force calculation unit 52 or the second regenerative braking force calculated by the second request braking force calculation unit 60.

As illustrated in FIG. 14, the regeneration request upper limit is equivalent to the regenerative coordination distribution line in the region where the vehicle speed is equal to or greater than the switching vehicle speed. Further, the regeneration request upper limit is equivalent to regeneration limit line in the region where the vehicle speed is less than the switching vehicle speed.

Accordingly, the regenerative coordination control unit 64, if the vehicle C is travelling (if the vehicle C is not stopped), selects the regeneration request upper limit as a value greater than zero.

As illustrated in FIG. 14, the inclination angle of the line represented by the regeneration request upper limit is equal to or less than the inclination angle of the line represented by the control limit gain even if the vehicle speed is less than the threshold vehicle speed, the switching vehicle speed, and regeneration limit vehicle speed.

From the above, when the operation amount of the accelerator pedal AP is less than the threshold value and the brake pedal BP is operated, the regenerative coordination control unit 64 selects a larger request value out of the request values calculated by the first request braking force calculation unit 52 and the second request braking force calculation unit 60. In other words, when the operation amount of the accelerator pedal AP is less than the threshold value and the brake pedal BP is operated, the regenerative coordination control unit 64 selects a larger regenerative braking force out of the first regenerative braking force and the second regenerative braking force. Note that in the first embodiment, as one example, a case where when the operation amount of the accelerator pedal AP is less than the threshold value, until the vehicle C is stopped, the regenerative braking force is generated and the vehicle speed is decreased is described.

The friction braking force calculation unit 66 receives, from the request braking force summation unit 62, the sum braking force signal and receives, from the regenerative braking force control unit 54, the regenerative torque signal. The friction braking force calculation unit 66 subtracts, from the summation request braking force included in the sum braking force signal, the regenerative execution amount included in the regenerative torque signal and calculates a friction execution amount.

The friction execution amount is the friction braking force that is actually generated at the wheel W.

The friction braking force calculation unit 66 that has calculated the friction execution amount calculates the friction braking force command value.

The friction braking force command value is the target value of the liquid pressure generated at a master cylinder 18 for generating the friction braking force depending on the friction execution amount.

The friction braking force calculation unit 66 that has calculated the friction braking force command value outputs an information signal including the calculated friction braking force command value (hereinafter sometimes referred to as "friction braking force signal") to the braking hydraulic pressure control unit 68.

The braking hydraulic pressure control unit 68 outputs the friction braking force command value to the master cylinder 18.

The master cylinder 18 is a device for supplying, to a wheel cylinder WS, a brake fluid.

The master cylinder 18 that has received the friction braking force command value actuates the braking motor (not illustrated) or the like built in, for example, the master cylinder 18 to actuate the piston in the master cylinder 18. Accordingly, in the master cylinder 18, the liquid pressure depending on the friction braking force command value is generated. Then, the brake fluid of the liquid pressure depending on the friction braking force command value is supplied to the wheel cylinder WS. Note that detailed configurations of the wheel cylinder WS are described later.

As described above, the friction braking force control unit 6, at the master cylinder 18 and the wheel cylinder WS, generates the friction braking force to the wheel W of the vehicle C.

The friction braking force control unit 6 generates, at the master cylinder 18 and the wheel cylinder WS, the friction braking force depending on the deviation between the request values summed by the request braking force summation unit 62 and the regenerative braking force generated at the driving motor DM by the regenerative braking force control unit 54.

Note that in a state where, for example, an information signal indicating that the driver operates the brake pedal BP is received, if an information signal indicating that the driver operates the accelerator pedal AP is received, the braking/driving force control device 1 conducts, for example, the calculation processes by assuming that the target driving torque is zero.

(Configuration of Vehicle C)

With reference to FIG. 1 to FIG. 14, configurations of the vehicle C having the braking/driving force control device 1 are described.

As illustrated in FIG. 2, the vehicle C having the braking/driving force control device 1 includes the accelerator pedal AP, the accelerator sensor APS, the brake pedal BP, the brake sensor BPS, the wheel speed sensor 16, and the motor rotation speed sensor MS. Additionally, the vehicle C includes the ITS control unit 2, the motor control unit 4, and the friction braking force control unit 6. Further, the vehicle C includes the master cylinder 18, the wheel cylinder WS, the battery BAT, the inverter INV, the driving motor DM, the transmission TR, and the wheel W (a right front wheel WFR, a left front wheel WFL, a right rear wheel WRR, and a left rear wheel WRL).

Descriptions of the accelerator pedal AP, the accelerator sensor APS, the brake pedal BP, and the brake sensor BPS are omitted because the descriptions of those elements are already made above.

Each of the wheel speed sensor 16 is provided to each of the wheel W in a corresponding manner.

The wheel speed sensor 16, for one revolution of the corresponding wheel W, generates the predetermined number of wheel speed pulses. The wheel speed sensor 16 outputs an information signal including the generated wheel speed pulse (hereinafter sometimes referred to as "wheel speed pulse signal") to the vehicle speed calculation unit 14.

Note that in FIG. 2, the wheel speed sensor 16 that generates the wheel speed pulse for one revolution of the right front wheel WFR is represented as the wheel speed sensor 16FR and the wheel speed sensor 16 that generates the wheel speed pulse for one revolution of the left front wheel WFL is represented as the wheel speed sensor 16FL. Similarly, in FIG. 2, the wheel speed sensor 16 that generates the wheel speed pulse for one revolution of the right rear wheel WRR is represented as the wheel speed sensor 16RR and the wheel speed sensor 16 that generates the wheel speed pulse for one revolution of the left rear wheel WRL is represented as the wheel speed sensor 16RL. In the following descriptions also, each of the wheels W and each of the wheel speed sensors 16 may be represented as above.

Descriptions of the motor rotation speed sensor MS are omitted because the descriptions of the sensor are already made above.

Descriptions of the ITS control unit 2, the motor control unit 4, the friction braking force control unit 6, and the master cylinder 18 are omitted because the descriptions of those units are already made above.

The wheel cylinder WS generates the pressing force for pressing the brake pad (not illustrated) included in the disc brake to the disc rotor (not illustrated). The disc rotor rotates together with each of the wheels W, contacts the brake pad and generates a friction resistance.

In other words, the master cylinder 18 and each of the wheel cylinders WS are respectively provided to a front wheel WF and a rear wheel WR and form a friction brake that generates the friction braking force to each of the wheels W.

Accordingly, the friction brake of the vehicle C generates the friction braking force to all of the wheels W (right front wheel WFR, left front wheel WFL, right rear wheel WRR, and left rear wheel WRL).

Note that in FIG. 2, the wheel cylinder WS arranged for the right front wheel WFR is represented as the wheel cylinder WSFR and the wheel cylinder WS arranged for the left front wheel WFL is represented as the wheel cylinder WSFL. Similarly, in FIG. 2, the wheel cylinder WS arranged for the right rear wheel WRR is represented as the wheel cylinder WSRR and the wheel cylinder WS arranged for the left rear wheel WRL is represented as the wheel cylinder WSRL. In the following descriptions also, each of the wheel cylinders WS may be represented as above.

The battery BAT is formed using, for example, a lithium ion battery.

To the battery BAT, a battery controller (not illustrated) that can detect a current value, a voltage value, a temperature and the like of the battery BAT is provided. The battery controller detects the SOC of the battery BAT and outputs an information signal including the detected SOC to the regenerative braking force control unit 54.

To the battery BAT, the power generated by the driving motor DM through the regenerative braking is charged via the inverter INV.

When the inverter INV receives, from the driving force control unit 50, the driving current command value, the inverter INV outputs the driving current command value included in driving torque signal to the driving motor DM. When the inverter INV receives, from the regenerative braking force control unit 54, the regenerative torque signal, the inverter INV outputs the regenerative current command value included in the regenerative torque signal to the driving motor DM.

When the driving motor DM receives, from the inverter INV, the driving current command value, the driving motor DM generates the driving force depending on the driving current command value.

The driving force generated by the driving motor DM is, via a drive shaft (not illustrated) or the like, given to each of the wheels W.

When the driving motor DM receives, from the inverter INV, the regenerative current command value, the driving motor DM generates the regenerative braking force depending on the driving current command value.

The regenerative braking force generated by the driving motor DM is given to each of the wheels W via a drive shaft or the like.

Note that in the first embodiment, as one example, a configuration in which the driving motor DM generates the driving force or the regenerative braking force only to the right front wheel WFR and the left front wheel WFL, i.e., only to the front wheel WF is described.

Accordingly, the vehicle C of the first embodiment is a vehicle (EV: Electric Vehicle) in which the drive source that generates the driving force is an electric motor. Further, the vehicle C in the first embodiment is a vehicle (2WD vehicle) in which the drive system is a two-wheel drive. In the vehicle C of the first embodiment, the right front wheel WFR and the left front wheel WFL are driving wheels.

The transmission TR, based on the operation state of the shift lever (shift switch) by the driver, switches the travelling ranges (for example, "P: parking" range, "D: drive" range, "R: reverse" range and the like). Accordingly, the rotation direction and the rotation state of the wheels W are switched.

To the wheel W, from the driving motor DM, the driving force or the regenerative braking force is given.

Further, to the wheel W, the friction braking force is given via the wheel cylinder WS.

(Processes Conducted by the ITS Control Unit 2, Processes Conducted by the Motor Control Unit 4, and Processes Conducted by the Friction Braking Force Control Unit 6)

With reference to FIG. 1 to FIG. 14, using FIG. 15A and FIG. 15B, and FIG. 16 and FIG. 17, one example of a process conducted by the ITS control unit 2, one example of a process conducted by the motor control unit 4, and one example of a process conducted by the friction braking force control unit 6 are described. Note that in the following descriptions, the processes conducted by the ITS control unit 2, the motor control unit 4 and the friction braking force control unit 6 may be referred to as "braking/driving force control process".

Figure 15A:
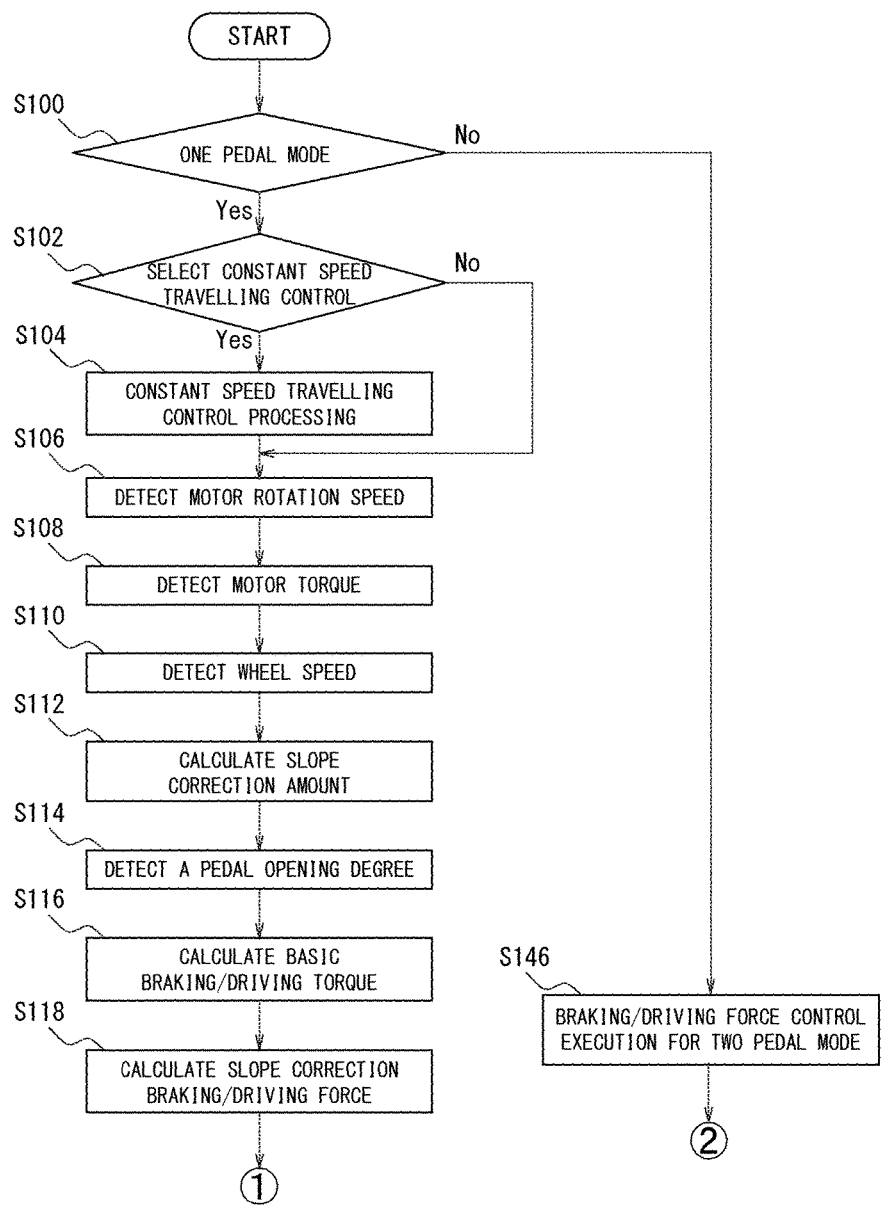
FIG. 15A is a flowchart illustrating processes conducted by the braking/driving force control device according to the first embodiment of the present invention.
Figure 15B:
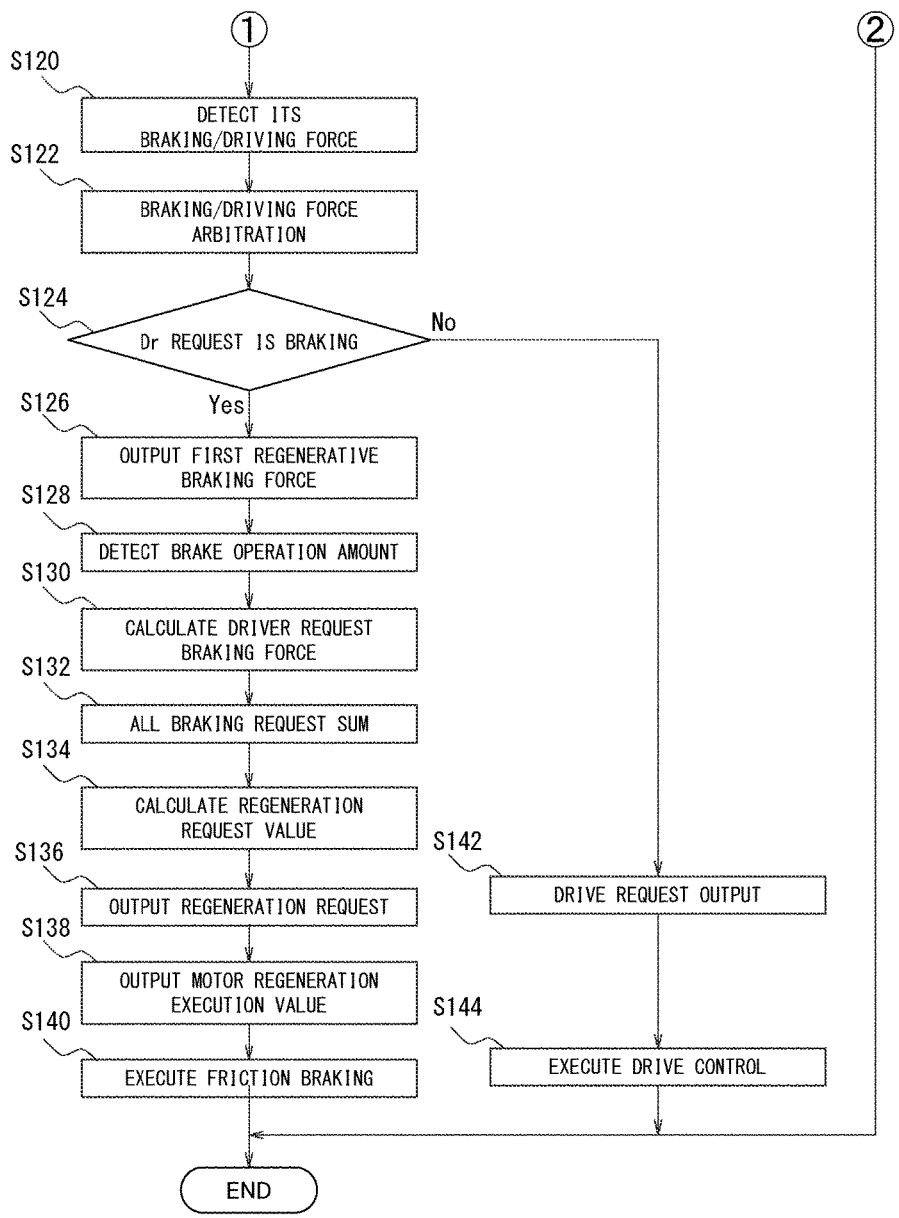
FIG. 15B is a flowchart illustrating processes conducted by the braking/driving force control device according to the first embodiment of the present invention.

As illustrated in FIG. 15A and FIG. 15B, when the braking/driving force control process is started (START), first a process of a step S100 is conducted.

At the step S100, the operation state of the mode selection switch 12 is detected. Accordingly, at the step S100, a process of determining whether or not a "one pedal mode" is selected as the control mode of the vehicle C is conducted ("one pedal mode" in the drawing).

At the step S100, when it is determined that the "one pedal mode" is selected as the control mode of the vehicle C ("Yes" in the drawing), the braking/driving force control process proceeds to a step S102.

On the other hand, at the step S100, when it is determined that the "two pedal mode" is selected as the control mode of the vehicle C ("No" in the drawing), the braking/driving force control process proceeds to a step S146.

At the step S102, the operation state of the constant speed traveling control setting switch is detected. Accordingly, at the step S102, a process of determining whether or not the "constant speed traveling control" is selected as the control mode of the vehicle C is conducted ("select constant speed traveling control" in the drawing).

At the step S102, when it is determined that the "constant speed traveling control" is selected as the control mode of the vehicle C ("Yes" in the drawing), the braking/driving force control process proceeds to a step S104.

On the other hand, at the step S102, when it is determined that the "constant speed traveling control" is not selected as the control mode of the vehicle C ("No" in the drawing), the braking/driving force control process proceeds to step S106.

At the step S104, the ITS control unit 2 conducts the process necessary for the constant speed traveling control ("constant speed traveling control processing" in the drawing). After the process necessary for the constant speed traveling control is conducted at the step S104, the braking/driving force control process proceeds to a step S106.

Note that details of the process conducted at step S104 are described later.

At a step S106, the motor rotation speed sensor MS detects the rotation speed of the motor driving force output shaft of the driving motor DM. Accordingly, at the step S106, the rotation speed of the driving motor DM is detected ("detect motor rotation speed" in the drawing). After the rotation speed of the driving motor DM is detected at the step S106, the braking/driving force control process to the step S108.

At the step S108, depending on the driving current command value calculated by the driving force control unit 50, the slope detection unit 42 detects the driving torque generated to the driving motor DM ("detect motor torque" in the drawing). After the driving torque generated to the driving motor DM is detected at the step S108, the braking/driving force control process proceeds to the step S110.

At the step S110, each of the wheel speed sensors 16 detects the rotation state of the corresponding wheel W as a wheel speed pulse. Accordingly, at the step S110, the revolution speed of each of the wheels W is detected ("detect wheel speed" in the drawing). After the revolution speed of each of the wheels W is detected at the step S110, the braking/driving force control process proceeds to the step S112.

At the step S112, the braking/driving force correction unit 44 calculates a parameter for correcting the braking force or the driving force based on the direction and the magnitude of the slope ("calculate slope correction amount" in the drawing). After a parameter for correcting the braking force or the driving force is calculated based on the direction and the magnitude of the slope at the step S112, the braking/driving force control process proceeds to the step S114.

At the step S114, the accelerator sensor APS detects the operation amount of the accelerator pedal AP by the driver. Accordingly, at the step S114, the opening degree of the accelerator pedal AP is detected ("detect A pedal opening degree" in the drawing). After the opening degree of the accelerator pedal AP is detected at the step S114, the braking/driving force control process proceeds to the step S116.

At the step S116, the basic braking/driving force calculation unit 40 calculates the target driving torque or the target braking torque based on the vehicle speed depending on the revolution speed detected at the step S110 and the opening degree of the accelerator pedal AP detected at the step S114. In other words, at the step S116, the driving torque or the braking torque depending on the braking/driving force map illustrated in FIG. 10 is calculated ("calculate basic braking/driving torque" in the drawing). After the driving torque or the braking torque depending on the braking/driving force map is calculated at the step S116, the braking/driving force control process proceeds to the step S118.

At the step S118, the braking/driving force correction unit 44 calculates the corrected braking force or the corrected driving force ("calculate slope correction braking/driving force" in the drawing). After the corrected braking force or the corrected driving force is calculated at the step S118, the braking/driving force control process proceeds to the step S120.

At the step S120, the arbitration control unit 46 detects the braking force or the driving force subjected to the filter process by the ITS output setting unit 26 (the "detect ITS braking/driving force" in the drawing). After the braking force or the driving force subjected to the filter process by the ITS output setting unit 26 is detected at the step S120, the braking/driving force control process proceeds to the step S122.

At the step S122, the arbitration control unit 46 compares an ITS output signal with the corrected driving force signal and selects a larger force out of the driving force or the braking force (select-high) ("braking/driving force arbitration" in the drawing). After selecting a larger value out of the driving force or the braking force included in the ITS output signal and the corrected driving force signal at the step S122, the braking/driving force control process proceeds to the step S124.

At the step S124, the determination is made as to whether or not the arbitration control unit 46 selects the braking force at the step S124 ("Dr request is braking" in the drawing).

At the step S124, when it is determined that the arbitration control unit 46 selects the braking force at the step S124 ("Yes" in the drawing), the braking/driving force control process proceeds to the step S126.

On the other hand, at the step S124, when it is determined that the arbitration control unit 46 selects the driving force at the step S124 ("No" in the drawing), the braking/driving force control process proceeds to the step S142.

At the step S126, the first request braking force calculation unit 52 calculates the first regenerative braking force depending on the operation amount of the accelerator pedal AP and the vehicle speed. Further, at the step S126, the first braking request signal including the calculated first regenerative braking force is output to the friction braking force control unit 6 ("output first regenerative braking force" in the drawing). After the first braking request signal is output at the step S126, the braking/driving force control process proceeds to the step S128.

Note that the first regenerative braking force is calculated in the step S126 such that, as illustrated in, for example, FIG. 11, when vehicle speed is equal to or less than the first threshold vehicle speed, the vehicle speed and also the first regenerative braking force are lowered and when the vehicle speed is zero, the first regenerative braking force also becomes zero.

In other words, at the step S126, when the vehicle speed is equal to or less than the first threshold vehicle speed, the first regenerative braking force that can smoothly stop the vehicle C (Smooth stop: SS) is calculated.

At the step S128, the brake sensor BPS detects the operation amount of the brake pedal BP by the driver. Accordingly, at the step S128, the operation amount of the brake pedal BP is detected (the "detect brake operation amount" in the drawing). After the operation amount of the brake pedal BP is detected at the step S128, the braking/driving force control process proceeds to the step S130.

At the step S130, the second request braking force calculation unit 60 calculates the second braking request as a request of the braking force depending on the operation amount of the brake pedal BP by the driver and the vehicle speed (the "calculate driver request braking force" in the drawing). After the second braking request is calculated at the step S130, the braking/driving force control process proceeds to the step S132.

At the step S132, the request braking force summation unit 62 sums the first regenerative braking force calculated at the step S126 and the second braking request calculated at the step S130 (the "all braking request sum" in the drawing). After the first regenerative braking force and the second braking request are summed at the step S132, the braking/driving force control process proceeds to the step S134.

At the step S134, the regenerative coordination control unit 64 compares the first regenerative braking force included in the first regenerative signal received from the request braking force summation unit 62 with the second regenerative braking force included in the second regenerative signal. At the step S134, the regenerative coordination control unit 64 selects a larger regenerative braking force (select-high) and sets the selected regenerative braking force as the request value of the regenerative braking force. Accordingly, at the step S134, the regenerative coordination control unit 64 calculates the request value of the regenerative braking force (the "calculate regeneration request value" in the drawing). After the request value of the regenerative braking force is calculated at the step S134, the braking/driving force control process proceeds to the step S136.

At the step S136, the regenerative coordination control unit 64 outputs the regeneration request value signal including the request value of the regenerative braking force to the regenerative braking force control unit 54 (the "output regeneration request" in the drawing). After the regeneration request value signal is output to the regenerative braking force control unit 54 at the step S136, the braking/driving force control process proceeds to the step S138.

At the step S138, the regenerative braking force control unit 54 calculates the regenerative current command value. Further, the regenerative torque signal including the regenerative current command value is output to the inverter INV. Accordingly, at the step S138, the driving motor DM generates the regenerative braking force depending on the regenerative current command value (the "output motor regeneration execution value" in the drawing).

In other words, at the step S138, the regenerative braking force control unit 54 generates a larger regenerative braking force out of the first regenerative braking force and the second regenerative braking force by the driving motor DM when the operation amount of the accelerator pedal AP is less than the threshold value and when the brake pedal BP is operated.

After the regenerative braking force depending on the regenerative current command value is generated at the step S138, the braking/driving force control process proceeds to the step S140.

At the step S140, the friction braking force calculation unit 66 calculates the friction braking force command value and the braking hydraulic pressure control unit 68 outputs the friction braking force command value to the master cylinder 18. Accordingly, at the step S140, the friction braking force depending on the friction braking force command value is generated (the "execute friction braking" in the drawing). After the friction braking force depending on the friction braking force command value is generated at the step S140, the braking/driving force control process is ended (END).

At the step S142, the braking/driving force distribution unit 48 outputs, to the driving force control unit 50, the driving force distribution signal (the "drive request output" in the drawing). After the driving force distribution signal is output to the driving force control unit 50 at the step S142, the braking/driving force control process proceeds to the step S144.

At the step S144, the driving force control unit 50 calculates the driving current command value and outputs the calculated driving torque signal to the inverter INV. Accordingly, the driving force depending on the driving current command value is generated by the driving motor DM at the step S144 (the "execute drive control" in the drawing). After the driving force depending on the driving current command value is generated at the step S144, the braking/driving force control process is ended (END).

At the step S146, the braking force and the driving force of the vehicle C are controlled depending on the "two pedal mode" (the "braking/driving force control execution for two pedal mode" in the drawing). Note that since the control of the braking force and the driving force depending on the "two pedal mode" is the known technology, descriptions of the control are omitted. After the braking force and the driving force of the vehicle C are controlled depending on the "two pedal mode" at the step S146, the braking/driving force control process is ended (END).

Next, with reference to FIG. 16, details of the process conducted at the above described step S104 are described (hereinafter sometimes referred to as "constant speed traveling control process").

Figure 16:
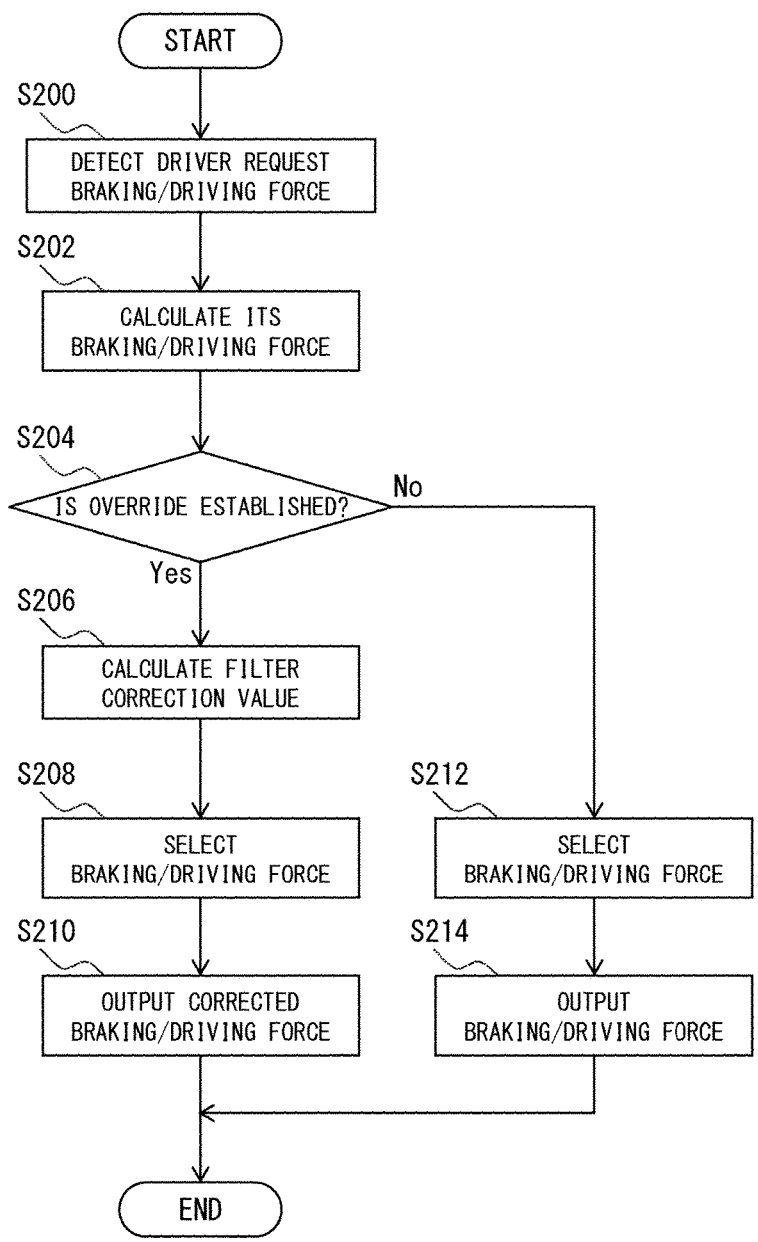
FIG. 16 is a flowchart illustrating constant speed traveling control processing.

As illustrated in FIG. 16, after the constant speed traveling control process is started (START), first the process of the step S200 is conducted.

At the step S200, the driver request braking/driving force detection unit 22 detects the driver request driving force or the driver request braking force (the "detect driver request braking/driving force" in the drawing). After the driver request driving force or the driver request braking force is detected at the step S200, the constant speed traveling control process proceeds to the step S202.

At the step S202, the ITS braking/driving force calculation unit 20 calculates the driving force or the braking force generated to the vehicle C depending on the speed difference between the set speed and the vehicle speed (the "calculate ITS braking/driving force" in the drawing). After the driving force or the braking force generated to the vehicle C depending on the speed difference between the set speed and the vehicle speed is calculated at the step S202, the constant speed traveling control process proceeds to the step S204.

At the step S204, with reference to the Dr override determination signal, the determination is made as to whether or not the driver override is established (the "IS override established?" in the drawing).

When at the step S204, it is determined that the driver override is established ("Yes" in the drawing), the constant speed traveling control process proceeds to the step S206.

On the other hand, at the step S204, when it is determined that the driver override is not established ("No" in the drawing), the constant speed traveling control process proceeds to the step S212.

At the step S206, the filter correction unit 24 corrects the ITS braking/driving force filter and calculates the filter correction value (the "calculate filter correction value" in the drawing). After the filter correction value is calculated at the step S206, the constant speed traveling control process proceeds to the step S208.

Note that details of the process conducted at the step S206 are described later.

At the step S208, the ITS output setting unit 26 selects any one of the braking force or the driving force included in the ITS braking/driving force signal, the driver request driving force, and the driver request braking force (the "select braking/driving force" in the drawing). After one of the braking force or the driving force included in the ITS braking/driving force signal, the driver request driving force, and the driver request braking force is selected at the step S208, the constant speed traveling control process proceeds to the step S210.

At the step S210, the ITS output setting unit 26 conducts the filter process to any one of the braking force, the driving force, the driver request driving force, and the driver request braking force selected at the step S208 using the filter correction value calculated at the step S206. Accordingly, at the step S210, any one of the braking force, the driving force, the driver request driving force, and the driver request braking force selected at the step S208 is corrected.

Further, at the step S210, the corrected ITS output signal including the corrected ITS braking/driving force that is the corrected value is output to the motor control unit 4 (the "output corrected braking/driving force" in the drawing). After the corrected ITS output signal is output to the motor control unit 4 at the step S210, the constant speed traveling control process is ended (END).

At the step S212, as similar to the step S208, the ITS output setting unit 26 selects any one of the braking force or the driving force included in the ITS braking/driving force signal, the driver request driving force, and the driver request braking force (the "select braking/driving force" in the drawing). After one of the braking force or the driving force included in the ITS braking/driving force signal, the driver request driving force, and the driver request braking force is selected at the step S212, the constant speed traveling control process proceeds to the step S214.

At the step S214, the ITS output setting unit 26 outputs, to the motor control unit 4, the corrected ITS output signal including any one of the braking force, the driving force, the driver request driving force, and the driver request braking force selected at the step S212 ("output braking/driving force" in the drawing). After the corrected ITS output signal is output to the motor control unit 4 at the step S214, the constant speed traveling control process is ended (END).

Next, with reference to FIG. 17, details of the process conducted at the above described step S206 are described (hereinafter sometimes referred to as "filter correction value calculation process").

Figure 17:
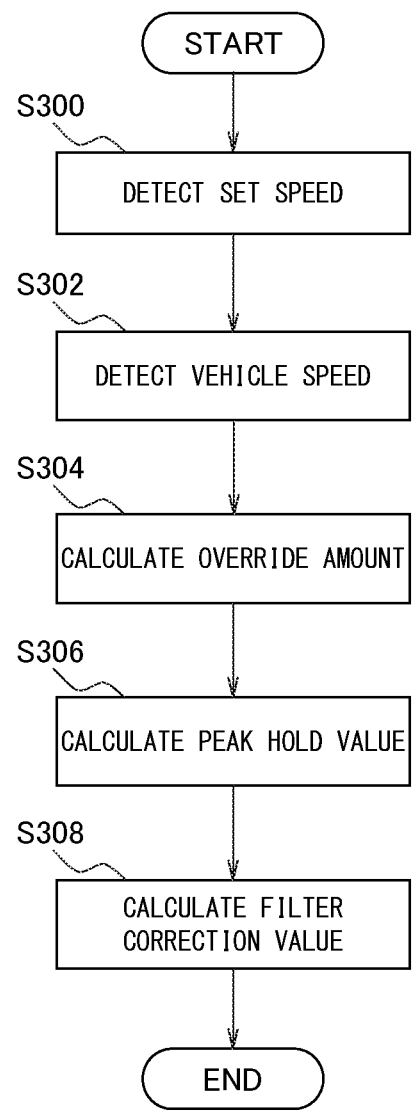
FIG. 17 is a flowchart illustrating filter correction value calculation process.

As illustrated in FIG. 17, after the filter correction value calculation process is started (START), first, the process of the step S300 is conducted.

At the step S300, the override amount calculation unit 30 detects the set speed ("detect set speed" in the drawing). After the set speed is detected at the step S300, the filter correction value calculation process proceeds to the step S302.

At the step S302, the override amount calculation unit 30 detects the travelling speed (vehicle speed) of the vehicle C (the vehicle) ("detect vehicle speed" in the drawing). After the travelling speed of the vehicle C is detected at the step S302, the filter correction value calculation process proceeds to the step S304.

At the step S304, the override amount calculation unit 30 subtracts, from the travelling speed detected at the step S302, the set speed detected at the step S300 and calculates the deviation amount. Further, at the step S304, the override amount calculation unit 30 inputs the calculated deviation amount to the override amount calculation map to calculate the override amount ("calculate override amount" in the drawing). After the override amount is calculated at the step S304, the filter correction value calculation process proceeds to the step S306.

At the step S306, the peak hold processing unit 32 calculates the peak hold upper limit value or the peak hold lower limit value ("calculate peak hold value" in the drawing). After the peak hold upper limit value or the peak hold lower limit value is calculated at the step S306, the filter correction value calculation process proceeds to the step S308.

At the step S308, based on the peak hold upper limit value or the peak hold lower limit value calculated at the step S306, the filter correction value is calculated. After the filter correction value is calculated at the step S308, the filter correction value calculation process is ended (END).

(Operations)

Figure 18A:
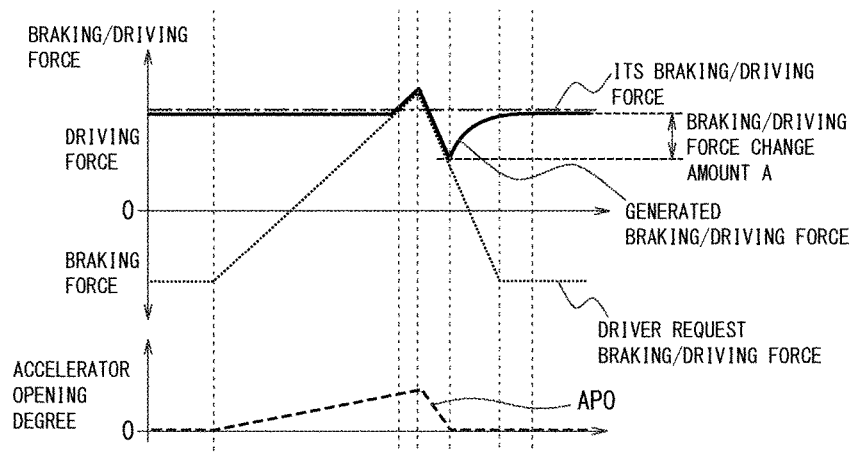
FIGS. 18A and 18B are time charts illustrating operations of a vehicle.
Figure 18B:
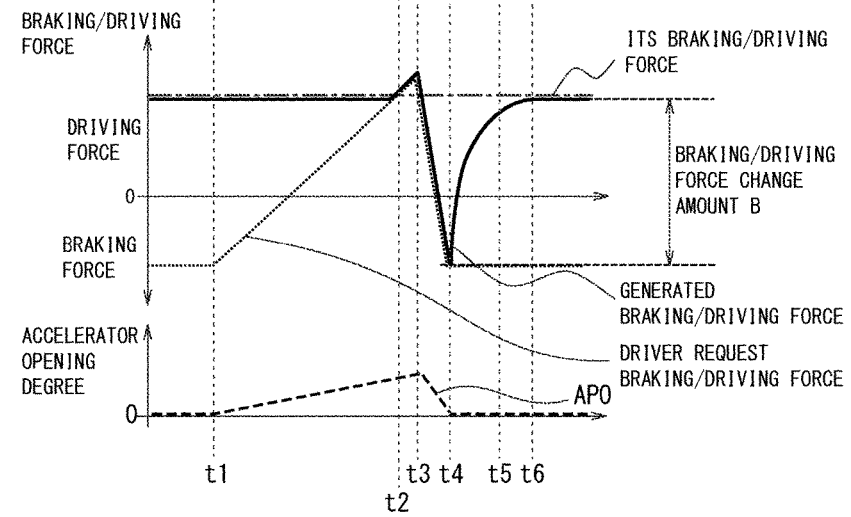

With reference to FIG. 1 to FIG. 17, using FIGS. 18A and 18B, one example of operations conducted using the braking/driving force control device 1 according to the first embodiment is described. Note that FIG. 18A illustrates a time chart of the operations conducted with a configuration applied with the braking/driving force control device 1 according to the first embodiment. FIG. 18B illustrates a time chart of the operations conducted with a configuration not applied with the braking/driving force control device 1 according to the first embodiment.

FIGS. 18A and 18B illustrate a state where the vehicle C travels on the flat road surface (flat road). The time chart illustrated in FIGS. 18A and 18B start from a state where the driver does not operate the accelerator pedal AP and the ITS control unit 2 conducts the control (constant speed traveling control) to make the vehicle C travel at the set speed. In other words, the time chart illustrated in FIGS. 18A and 18B start from a state where the driver operates the constant speed traveling control setting switch and selects the conduction of the constant speed traveling control.

When the time chart illustrated in FIGS. 18A and 18B is started, in a state where the driver does not operate the accelerator pedal AP, on the flat road, the driving force for allowing the vehicle C to travel at the set speed is generated to the vehicle C.

As to the driving force generated to the vehicle C, the driving force depending on the operation amount of the accelerator pedal AP by the driver is compared with the driving force calculated by the constant speed driving force calculation unit 20. Then, a larger driving force is selected (select-high) to set the driving force generated to the vehicle C.

Note that in FIGS. 18A and 18B, the braking/driving force depending on the operation amount of the accelerator pedal AP by the driver is represented as the "driver request braking/driving force". Similarly, in FIGS. 18A and 18B, the braking/driving force calculated by the ITS control unit 2 (in FIGS. 18A and 18B, only the driving force calculated by the constant speed driving force calculation unit 20) is represented as the "ITS braking/driving force". Further, in FIGS. 18A and 18B, the operation amount (opening degree) of the accelerator pedal AP is denoted with the reference numeral "APO".

Accordingly, as illustrated in FIGS. 18A and 18B, in a state where the driver does not operate the accelerator pedal AP, the driving force calculated by the constant speed driving force calculation unit 20 is set as the driving force generated to the vehicle C.

In a state where the driving force calculated by the constant speed driving force calculation unit 20 is generated to the vehicle C and the vehicle C travels on the flat road, from a point of time (point of time t1) when the driver starts the operation of the accelerator pedal AP, as the "APO" increases, the braking force of the driver request braking/driving force decreases. Further, after the braking force becomes zero, as the "APO" increases, the driving force of the driver request braking/driving force increases.

During a period from the point of time when the time chart is started to the point of time t2, the driver override is not established. Note that the point of time t2 is a point of time when a value of the driving force of the driver request braking/driving force that increases together with the "APO" is equal to a value of a driving force of the ITS braking/driving force.

Thus, during a period from the point of time when the time chart is started to the point of time t2, the driving force of the ITS braking/driving force that is a larger driving force is selected out of the driving force of the driver request braking/driving force and the driving force of the ITS braking/driving force as the driving force generated to the vehicle C (select-high).

Note that in FIGS. 18A and 18B, the braking force or the driving force to be actually generated at the vehicle C out of the "driver request braking/driving force" and the "ITS braking/driving force" is represented as the "generated braking/driving force".

Accordingly, when during the conduction of the constant speed traveling control, the driver request braking/driving force is equal to or less than the ITS braking/driving force, i.e., during a period from the point of time when the time chart is started to the point of time t2, the driving force depending on the ITS braking/driving force is generated.

At or after the point of time t2 in which the driving force of the driver request braking/driving force (driver demand torque) that increases together with the "APO" exceeds the driving force of the ITS braking/driving force (target driving torque), the driver override is established.

Thus, at or after the point of time t2, i.e., after the driver demand torque exceeds the target driving torque during the conduction of the constant speed traveling control, until the "APO" decreases to become zero, the driving force or the braking force of the driver request braking/driving force is selected as the driving force or the braking force generated at the vehicle C.

At or after the point of time t2, the correction processing unit 26a, using the filter having the normal time constant, conducts the filter process to the driver request driving force. Accordingly, the driving force is increased depending on the increase in the "APO".

Accordingly, at or after the point of time t2, i.e., after the driver demand torque exceeds the target driving torque during the constant speed traveling control, when the operation amount of the accelerator pedal AP increases, the driving force is increased depending on the increase in the operation amount. Accordingly, the driving force depending on the driving force of the driver request braking/driving force (driver demand torque) is generated.

The "APO" that increases at or after the point of time t2 changes to a decreasing state, and from the point of time (the point of time t3) when the state of the "APO" changes from the increasing state to the decreasing state, depending on the decrease in the "APO", the driving force of the driver request braking/driving force decreases.

Accordingly, at or after the point of time t2, i.e., after the driver demand torque exceeds the target driving torque during the constant speed traveling control, when the operation amount of the accelerator pedal AP decreases, depending on the decrease in the operation amount of the accelerator pedal AP, the driving force decreases or the braking force increases.

In the braking/driving force control device 1 according to the first embodiment, when the driver override is established, the correction processing unit 26a, using the correction time constant filter having the corrected time constant, conducts the filter process to the driver request driving force.

Accordingly, as illustrated in FIG. 18A, at or after the point of time t3, the correction processing unit 26a, using the correction time constant filter having the corrected time constant, conducts the filter process to the driver request driving force. The driving force is decreased depending on the decrease in the "APO", such that a change rate of the driving force is smaller than that when the filter having the normal time constant is used.

In other words, in the braking/driving force control device 1 according to the first embodiment, at or after the point of time t3, in accordance with the decrease in the operation amount of the accelerator pedal AP, the driving force is decreased or the braking force is increased. Additionally, the transfer function between the operation in the decreasing direction of the accelerator pedal AP and the change in the braking/driving force is changed to the direction in which the change in the braking/driving force is delayed. For example, the decreased amount of the driving force and the increased amount of the braking force per unit time are controlled to be smaller than the decreased amount of the driving force and the increased amount of the braking force per unit time when the constant speed traveling control is not conducted.

In the braking/driving force control device 1 according to the first embodiment, at or after the point of time t3, the change amount of the driving force and the braking force is set so as to be reduced depending on the peak hold value calculated at the above described step S306 compared to when the constant speed traveling control is not conducted. In other words, at or after the point of time t3, depending on the override amount, the transfer function between the operation in the decreasing direction of the accelerator pedal AP and the change in the braking/driving force is changed to a direction in which the change in the braking/driving force is delayed.

In the braking/driving force control device 1 according to the first embodiment, as described above, in the process conducted by the peak hold processing unit 32, the maximum value of the override amount is held after the constant speed traveling control is stopped until the operation amount of the accelerator pedal AP becomes zero.

Accordingly, in the braking/driving force control device 1 according to the first embodiment, at or after the point of time t2 and until the operation amount of the accelerator pedal AP becomes zero, the change amount of the driving force and the braking force is set to be reduced depending on the held maximum value of the override amount compared to when the constant speed traveling control is not conducted. In other words, at or after the point of time t2, until the operation amount of the accelerator pedal AP becomes zero, based on the override amount, the change amount of the driving force and the braking force depending on the operation in the decreasing direction of the accelerator pedal AP is set.

On the other hand, with a configuration not applied with the braking/driving force control device 1 according to the first embodiment, when the driver override is established, using the filter having the normal time constant, the filter process is conducted to the driver request driving force.

Accordingly, with a configuration not applied with the braking/driving force control device 1 according to the first embodiment, as illustrated in FIG. 18B, at or after the point of time t3, compared with the braking/driving force control device 1 according to the first embodiment, based on the decrease in the "APO", the driving force decreases at a large change rate.

At the point of time (point of time t4) when the "APO" that starts decreasing from the point of time t3 becomes "0", i.e., when the operation of the accelerator pedal AP by the driver is stopped (accelerator OFF), the driver override is not established.

Accordingly, at or after the point of time t4, until the driver operates the accelerator pedal AP again and the driving force of the driver request braking/driving force exceeds the driving force of the ITS braking/driving force, the driving force of the ITS braking/driving force is selected as the driving force generated at the vehicle C.

Accordingly, when the operation amount of the accelerator pedal AP becomes zero at or after the point of time t3, i.e., after the driver demand torque exceeds the target driving torque during the constant speed traveling control, and when the operation amount of the accelerator pedal AP becomes zero, a state returns to a state where the driving force depending on the target driving torque is generated. Thus, when the operation amount of the accelerator pedal AP becomes zero at or after the point of time t3, the driving force depending on the driving force of the ITS braking/driving force (target driving torque) is generated.

At or after the point of time t4, the driving force that has decreased from the point of time t3 increases to become the driving force of the ITS braking/driving force.

In the braking/driving force control device 1 according to the first embodiment, as illustrated in FIG. 18A, at or after the point of time t3, the driving force is decreased based on the decrease in the "APO" such that the change rate of the driving force is smaller than that when the filter having the normal time constant is used.

Specifically, at a point of time (point of time t5) after the point of time t4 when the "APO" that starts decreasing from the point of time t3 becomes "0", the change rate of the driving force is reduced such that the braking force of the driver request braking/driving force becomes the braking force in accordance with "APO=0".

Alternatively, with a configuration not applied with the braking/driving force control device 1 according to the first embodiment, as illustrated in FIG. 18B, at the point of time t4, the driving force and the braking force are changed such that the braking force of the driver request braking/driving force becomes the braking force in accordance with "APO=0". In other words, at a point of time when the "APO" that starts decreasing from the point of time t3 becomes "0", the driving force and the braking force are changed such that the braking force of the driver request braking/driving force becomes the braking force in accordance with "APO=0".

Accordingly, the braking/driving force control device 1 according to the first embodiment has the smaller change amount of the braking/driving force rather than a configuration not applied with the braking/driving force control device 1 according to the first embodiment during a period from the point of time t3 to the point of time t4.

Note that in FIG. 18A, the change amount of the braking/driving force (only driving force) from the point of time t3 to the point of time t4 is represented as the "braking/driving force change amount A". Further, in FIG. 18B, the change amount of the braking/driving force (driving force and braking force) from the point of time t3 to the point of time t4 is represented as the "braking/driving force change amount B".

As clearly illustrated in FIG. 18A and FIG. 18B, the "braking/driving force change amount A" is smaller than the "braking/driving force change amount B".

Accordingly, the braking/driving force control device 1 according to the first embodiment has the smaller change amount in the braking/driving force rather than a configuration not applied with the braking/driving force control device 1 according to the first embodiment during a period from the point of time t4 to a point of time (point of time t6) when the "generated braking/driving force" increases up to the driving force of the ITS braking/driving force.

Accordingly, the braking/driving force control device 1 according to the first embodiment can more effectively suppress the variation in the braking/driving force generated to the vehicle C rather than a configuration not applied with the braking/driving force control device 1 according to the first embodiment.

In the braking/driving force control device 1 according to the first embodiment, during the constant speed traveling control, the deceleration control depending on the operation amount of the accelerator pedal AP is conducted and even when the operation amount of the accelerator pedal AP becomes zero, the discomfort given to the driver can be reduced.

As described above, the ITS control unit 2, the driving force control unit 50, the friction braking force control unit 6, and the regenerative braking force control unit 54, during the constant speed traveling control, when the driver demand torque is equal to or less than the target driving torque, generate the driving force depending on the target driving torque. After the driver demand torque exceeds the target driving torque during the constant speed traveling control, the transfer function between the operation in the decreasing direction of the accelerator pedal AP and the change in the braking/driving force is changed to a direction in which the change in the braking/driving force is delayed. Further, during the constant speed traveling control, when the operation amount of the accelerator pedal AP becomes zero after the driver demand torque exceeds the target driving torque, a state returns to a state where the driving force depending on the target driving torque is generated.

In other words, when the driver demand torque is equal to or less than the target braking/driving torque, the ITS control unit 2, the driving force control unit 50, the friction braking force control unit 6, and the regenerative braking force control unit 54 control the acceleration/deceleration of the vehicle depending on the target braking/driving torque. Further, when the driver demand torque exceeds the target braking/driving torque, the ITS control unit 2, the driving force control unit 50, the friction braking force control unit 6, and the regenerative braking force control unit 54, control the acceleration/deceleration depending on the driver demand torque.

When the operation amount of the accelerator pedal AP decreases after the driver demand torque exceeds the target braking/driving torque, the driver demand torque is decreased depending on the decrease in the operation amount of the accelerator pedal AP. The decrease rate of the driver demand torque depending on the decrease in the operation amount of the accelerator pedal AP is set to be smaller than the decrease rate of the driver demand torque depending on the operation amount of the accelerator pedal AP when the driver does not set the travelling speed. Additionally, the acceleration/deceleration is controlled depending on the set driver demand torque, and when the operation amount of the accelerator pedal AP becomes zero, a state is returned to a state where the acceleration/deceleration is controlled depending on the target braking/driving torque.

Note that the above described driver request braking/driving force corresponds to a driver demand torque.

The above described target driving torque and target braking torque correspond to target braking/driving torques.

The above described wheel speed sensor 16 and vehicle speed calculation unit 14 correspond to a vehicle speed sensor that detects the travelling speed of the vehicle C.

The above described ITS braking/driving force calculation unit 20 corresponds to a target braking/driving torque calculation unit.

The above described driver request braking/driving force detection unit 22 corresponds to a driver demand torque calculation unit.

As described above, the ITS control unit 2, the driving force control unit 50, the friction braking force control unit 6, and the regenerative braking force control unit 54 correspond to a braking/driving force control unit.

As described above, in a braking/driving force control method using the braking/driving force control device 1 according to the first embodiment, during the conduction of the constant speed traveling control, when the driver demand torque is equal to or less than the target driving torque, the driving force depending on the target driving torque is generated. Further, in the method, after the driver demand torque exceeds the target driving torque during the conduction of the constant speed traveling control, the transfer function between the operation in the decreasing direction of the accelerator pedal AP and the change in the braking/driving force is changed to a direction in which the change in the braking/driving force is delayed.

When the operation amount of the accelerator pedal AP becomes zero after the driver demand torque exceeds the target driving torque during the conduction of the constant speed traveling control, a state is returned to a state where the driving force depending on the target driving torque is generated.

In other words, in the braking/driving force control method using the braking/driving force control device 1 according to the first embodiment, when the driver demand torque is equal to or less than the target braking/driving torque, the acceleration/deceleration of the vehicle is controlled depending on the target braking/driving torque. When the driver demand torque exceeds the target braking/driving torque, the acceleration/deceleration is controlled depending on the driver demand torque.

When the operation amount of the accelerator pedal AP decreases after the driver demand torque exceeds the target braking/driving torque, the driver demand torque is decreased depending on the decrease in the operation amount of the accelerator pedal AP. Additionally, the decrease rate of the driver demand torque depending on the decrease in the operation amount of the accelerator pedal AP is set to be smaller than the decrease rate of the driver demand torque depending on the operation amount of the accelerator pedal AP when the driver does not set the travelling speed. Further, the acceleration/deceleration is controlled depending on the set driver demand torque, and then when the operation amount of the accelerator pedal AP becomes zero, a state returns to a state where the acceleration/deceleration is controlled depending on the target braking/driving torque.

Note that the above described first embodiment is one example of the present invention, the present invention is not limited to the above described first embodiment, and even in a mode other than this embodiment, various modifications can be made depending on the design and the like within the scope not deviating from the technical idea of the present invention.

Effects of First Embodiment

With the braking/driving force control method using the braking/driving force control device 1 according to the first embodiment, following effects can be achieved.

(1) When the driver demand torque is equal to or less than the target braking/driving torque, the acceleration/deceleration of the vehicle is controlled depending on the target braking/driving torque. Further, when the driver demand torque exceeds the target braking/driving torque, the acceleration/deceleration is controlled depending on the driver demand torque.

When the operation amount of the accelerator pedal AP decreases after the driver demand torque exceeds the target braking/driving torque, the driver demand torque is decreased depending on the decrease in the operation amount of the accelerator pedal AP. Additionally, the decrease rate of the driver demand torque depending on the decrease in the operation amount of the accelerator pedal AP is set to be smaller than the decrease rate of the driver demand torque depending on the operation amount of the accelerator pedal AP when the driver does not set the travelling speed. Further, the acceleration/deceleration is controlled depending on the set driver demand torque, and then when the operation amount of the accelerator pedal AP becomes zero, a state returns to a state where the acceleration/deceleration is controlled depending on the target braking/driving torque.

While the vehicle is travelling at the travelling speed set by the driver, when the operation amount of the accelerator pedal AP decreases after the driver demand torque exceeds the target braking/driving torque, the driver demand torque is decreased depending on the decrease in the operation amount of the accelerator pedal AP. Additionally, the decrease rate of the driver demand torque depending on the decrease in the operation amount of the accelerator pedal AP is set to be smaller than the decrease rate of the driver demand torque depending on the operation amount of the accelerator pedal AP when the driver does not set the travelling speed.

As a result, it is possible to lower the reduction in the vehicle speed after the driver demand torque exceeds the target driving torque during the conduction of the constant speed traveling control until the operation amount of the accelerator pedal AP becomes zero. Accordingly, it is possible to reduce the change amount of the vehicle speed at the point of time when the operation amount of the accelerator pedal AP becomes zero and suppress the discomfort given to the driver.

It is possible to reduce the deviation between the vehicle speed intended by the driver and the vehicle speed by the control of the braking force and the driving force and suppress the separation between the vehicle speed intended by the driver and the vehicle speed by the control.

Accordingly, it is possible to suppress the discomfort given to the driver in a state where the operation amount of the accelerator pedal AP becomes zero after the driver demand torque exceeds the target driving torque during the conduction of the constant speed traveling control.

(2) The travelling speed of the vehicle C is detected and the override amount depending on the deviation amount in which the detected travelling speed exceeds the set speed is calculated. Further, based on the calculated override amount, the decrease rate of the driver demand torque depending on the decrease in the operation amount of the accelerator pedal AP is changed.

Accordingly, the decrease in the vehicle speed after the driver demand torque exceeds the target driving torque during the conduction of the constant speed traveling control until the operation amount of the accelerator pedal AP becomes zero can be changed depending on the deviation amount in which the travelling speed exceeds the set speed.

As a result, for example, it is possible to lower the decrease in the vehicle speed after stopping constant speed traveling control until restarting, as the deviation amount between the current travelling speed of the vehicle C and the travelling speed set by the constant speed traveling control becomes large. Accordingly, for example, it is possible to reduce the change amount of the vehicle speed in a state where the operation amount of the accelerator pedal AP becomes zero as the deviation amount between the current travelling speed of the vehicle C and the travelling speed set by the constant speed traveling control becomes large, and suppress the rapid change in the travelling speed.

(3) The override amount is held after the constant speed traveling control is stopped until the operation amount of the accelerator pedal AP becomes zero. Additionally, based on the held override amount (maximum value), the change amount of the driving force and the braking force depending on the operation in the decreasing direction of the accelerator pedal AP is set.

Accordingly, even if the override amount changes after the driver demand torque exceeds the target driving torque during the conduction of the constant speed traveling control until the operation amount of the accelerator pedal AP becomes zero, the change amount of the driving force and the braking force can be set depending on the maximum value of the override amount.

As a result, the decrease in the vehicle speed after the driver demand torque exceeds the target driving torque during the conduction of the constant speed traveling control until the operation amount of the accelerator pedal AP becomes zero can be changed depending on the deviation amount in which the travelling speed exceeds the set speed. Accordingly, even if the deviation amount decreases until the operation amount of the accelerator pedal AP becomes zero, it is possible to reduce the change amount of the vehicle speed at the point of time when the constant speed traveling control is restarted and suppress the rapid change in the travelling speed.

(4) When the operation amount of the accelerator pedal AP decreases after the driver demand torque exceeds the target braking/driving torque, the transfer function between the operation in the decreasing direction of the accelerator pedal AP and the change in the braking/driving force is changed to a direction in which the change in the braking/driving force is delayed.

Accordingly, the decrease in the vehicle speed after the driver demand torque exceeds the target driving torque during the conduction of the constant speed traveling control until the operation amount of the accelerator pedal AP becomes zero can be changed depending on the deviation amount in which the travelling speed exceeds the set speed.

As a result, for example, it is possible to reduce the decrease in the vehicle speed after stopping constant speed traveling control until restarting as the deviation amount between the current travelling speed of the vehicle C and the travelling speed set by the constant speed traveling control becomes large.

(5) The first regenerative braking force is calculated based on the set corrected braking force. Further, the operation amount of the brake pedal BP is detected and the second regenerative braking force is calculated depending on the detected operation amount of the brake pedal BP and the travelling speed of the vehicle C. When the operation amount of the accelerator pedal AP is less than the threshold value and when the brake pedal BP is operated, a larger regenerative braking force out of the first regenerative braking force and the second regenerative braking force is generated to the driving motor DM.

Thus, even if the brake pedal BP is operated in a state where the regenerative braking force depending on the direction of the road surface slope and the magnitude of the slope is generated, only a larger regenerative braking force out of the first regenerative braking force and the second regenerative braking force is generated to the driving motor DM.

As a result, in a situation where the brake pedal BP is operated in a state where the regenerative braking force depending on the operation amount of the accelerator pedal AP is generated, it is possible to generate a larger regenerative braking force out of the first regenerative braking force and the second regenerative braking force This prevents the simultaneous input of the two regenerative braking forces, suppresses the variation in the regenerative braking force, and relative to the travelling vehicle C, suppresses the variation in the vehicle speed not intended by the driver.

Accordingly, since the hunting of the regenerative execution amount can be prevented and the driving motor DM can be properly controlled, the vehicle C can be smoothly stopped.

A larger regenerative braking force out of the first regenerative braking force and the second regenerative braking force is generated, and the friction braking force corresponding to a smaller regenerative braking force out of the first regenerative braking force and the second regenerative braking force is generated.

Accordingly, a braking force obtained by summing the first regenerative braking force and the second regenerative braking force can be generated with the regenerative braking force and the friction braking force, and the deceleration depending on the braking force obtained by summing the first regenerative braking force and the second regenerative braking force can be generated to the vehicle C.

It is possible to expand an application range of the control in a situation where the brake pedal BP is operated when the regenerative braking force depending on the operation amount of the accelerator pedal AP is generated and the vehicle is decelerating.

With reference to FIG. 1 to FIGS. 18A and 18B, using FIGS. 19, 20A, and 20B, effects achieved by the above described method are described below. In other words, an explanation will be made about the effect of generating a larger regenerative braking force out of the first and the second regenerative braking force to the driving motor DM when the operation amount of the accelerator pedal AP is less than the threshold value and the brake pedal BP is operated.

In a configuration in which the regenerative braking force depending on the operation amount of the accelerator pedal AP and the regenerative braking force depending on the operation amount of the brake pedal BP can be generated, using separate braking force maps (two braking force maps), the regenerative braking force to be generated is set depending on the requested deceleration and vehicle speed. This is because since the regenerative braking force depending on the operation amount of the accelerator pedal AP differs from the regenerative braking force depending on the operation amount of the brake pedal BP in a main use method, considering the suitability and the like, it is preferable to manage each of the regenerative braking forces based on a separate map.

Figure 19:
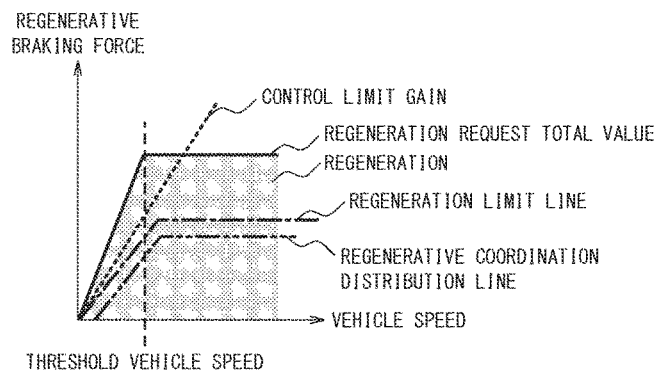
FIG. 19 is a drawing illustrating a braking force map with a configuration not applied with the braking/driving force control device according to the first embodiment of the present invention.

However, when the brake pedal BP is operated during the SS control, as illustrated in FIG. 19, for example, the upper limits of the regenerative braking forces (regeneration limit line, regenerative coordination distribution line) are summed in the two braking force maps. Accordingly, as illustrated in FIG. 19, the regeneration request upper limit becomes large. Thus, in the change area in which the upper limit of the regenerative braking force changes depending on the change in the vehicle speed, the degree of change of the deceleration relative to the change in the vehicle speed rapidly increases compared with the separate braking force map (see FIG. 11, FIG. 13). Note that the "SS control" indicates a state in which in a situation where the brake pedal BP is not operated, the regenerative braking force that can smoothly stop the vehicle C is output.

Note that in FIG. 19, the region corresponding to the regenerative braking force is represented as the "regeneration", a line representing the upper limit of the regenerative braking force depending on the vehicle speed is represented as the "regeneration limit line", and a line representing the upper limit of the regenerative braking force depending on the operation amount of the brake pedal BP and the vehicle speed is represented as the "regenerative coordination distribution line". Further, the vehicle speed corresponding to the border line between the change area in which the upper limit of the regenerative braking force changes depending on the change in the vehicle speed and the fixed area in which the upper limit of the regenerative braking force is constant is represented as the "threshold vehicle speed", and a line obtained by continuing sums of the regeneration limit line and the regenerative coordination distribution line is represented as the "regeneration request total value".

In the change area, if the degree of change of the deceleration relative to the change in the vehicle speed is rapidly increased, while the vehicle C is decelerating, the change in the vehicle speed may not follow the rapid change of the deceleration depending on the regenerative braking force, and relative to the change in the deceleration depending on the regenerative braking force, the delay in the change in the vehicle speed is caused.

Figure 20A:
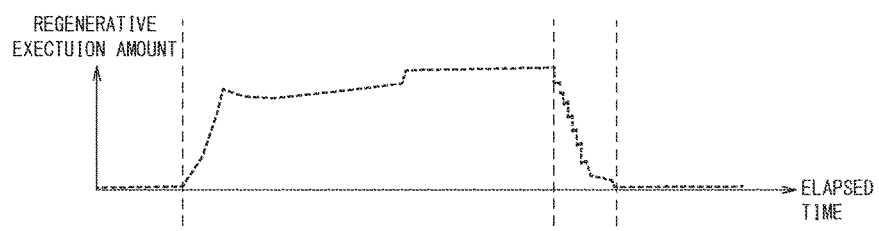
FIGS. 20A and 20B are time charts illustrating operations of a vehicle.

As illustrated in FIG. 20A, during a period after the vehicle speed is equal to or less than the threshold vehicle speed and the decrease in the regenerative execution amount is started until when the vehicle C is stopped, the change in the vehicle speed may not follow the regenerative execution amount that increases from the point of time when the deceleration is started and the hunting is caused to the regenerative execution amount. Note that in FIGS. 20A and 20B, the point of time when the deceleration is started is denoted with "t7", the point of time when the vehicle speed is equal to or less than the threshold vehicle speed, and the decrease in the regenerative execution amount is started is denoted with "t8", and the point of time when the vehicle C is stopped is denoted with "t9".

Alternatively, in the braking/driving force control method according to the first embodiment, when the brake pedal BP is operated during the SS control, a larger value is selected out of the request values calculated by assuming that the regeneration limit line or the regenerative coordination distribution line is the upper limit. Thus, from the point of time t8 to the point of time t9 in FIG. 20B, the upper limit value of the regenerative braking force is not a value obtained by summing the regeneration limit line and the regenerative coordination distribution line, but a value corresponding to a line out of the regeneration limit line or the regenerative coordination distribution line, whose value depending on the vehicle speed is larger than that of the other line.

Figure 20B:
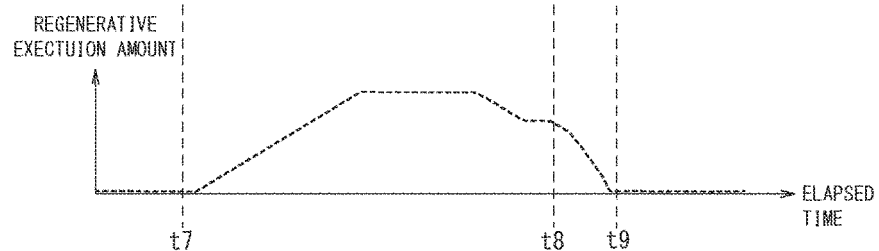

Thus, in the braking/driving force control method according to the first embodiment, when the brake pedal BP is operated during the SS control, the change in the vehicle speed follows the regenerative execution amount between the point of time t8 and the point of time t9, and thus as illustrated in FIG. 20B, the hunting is not caused to the regenerative execution amount. Even when the brake pedal BP is operated in a state where the regenerative braking force depending on the operation amount of the accelerator pedal AP is generated, the driving motor DM can be properly controlled, and thus, the vehicle C can be smoothly stopped.

Further, the braking/driving force control device 1 according to the first embodiment can achieve the following effects.

(6) When driver demand torque is equal to or less than the target braking/driving torque, The braking/driving force control unit including the ITS control unit 2, the driving force control unit 50, the friction braking force control unit 6, and the regenerative braking force control unit 54 controls the acceleration/deceleration of the vehicle depending on the target braking/driving torque. Further, when the driver demand torque exceeds the target braking/driving torque, the acceleration/deceleration is controlled depending on the driver demand torque.

When the operation amount of the accelerator pedal AP decreases after the driver demand torque exceeds the target braking/driving torque, the driver demand torque is decreased depending on the decrease in the operation amount of the accelerator pedal AP. The decrease rate of the driver demand torque depending on the decrease in the operation amount of the accelerator pedal AP is set to be smaller than the decrease rate of the driver demand torque depending on the operation amount of the accelerator pedal AP when the driver does not set the travelling speed. Additionally, the acceleration/deceleration is controlled depending on the set driver demand torque and when the operation amount of the accelerator pedal AP becomes zero, a state returns to a state where the acceleration/deceleration is controlled depending on the target braking/driving torque.

In this way, while the vehicle is travelling at the travelling speed set by the driver, when the operation amount of the accelerator pedal AP decreases after the driver demand torque exceeds the target braking/driving torque, the driver demand torque is decreased depending on the decrease in the operation amount of the accelerator pedal AP. Additionally, the decrease rate of the driver demand torque depending on the decrease in the operation amount of the accelerator pedal AP is set to be smaller than the decrease rate of the driver demand torque depending on the operation amount of the accelerator pedal AP when the driver does not set the travelling speed.

As a result, it is possible to lower the decrease in the vehicle speed after the driver demand torque exceeds the target driving torque during the conduction of the constant speed traveling control until the operation amount of the accelerator pedal AP becomes zero. Accordingly, it is possible to reduce the change amount of the vehicle speed at the point of time when the operation amount of the accelerator pedal AP becomes zero and suppress the discomfort given to the driver.

Further, it is possible to reduce the deviation between the vehicle speed intended by the driver and the vehicle speed by the control of the braking force and the driving force and suppress the separation between the vehicle speed intended by the driver and the vehicle speed by the control. Accordingly, in a state where the operation amount of the accelerator pedal AP becomes zero after the driver demand torque exceeds the target driving torque during the conduction of the constant speed traveling control, the discomfort given to the driver can be suppressed.

Variation of First Embodiment (1) In the override amount calculation map of the first embodiment, a relationship between the change in the deviation amount and the change in the override amount is a directly proportional relationship, but a configuration of the override amount calculation map is not limited thereto.

Figure 21:
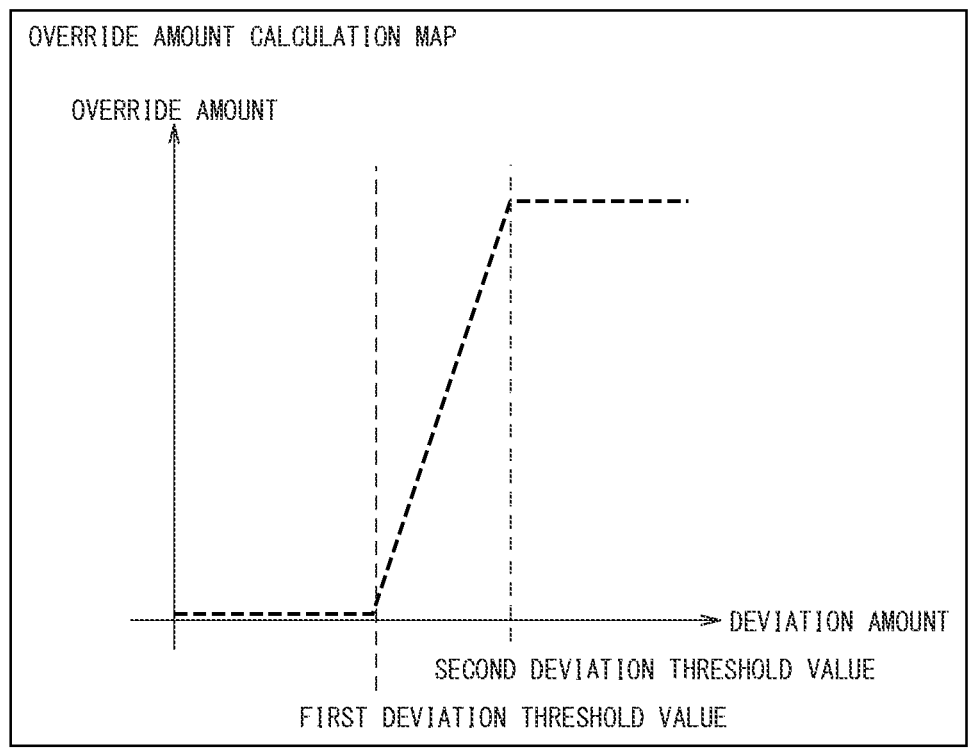
FIG. 21 is a drawing illustrating a variation of the first embodiment of the present invention.

In other words, for example, as illustrated in FIG. 21, the override amount calculation map may include a region in which a relationship between the change in the deviation amount and the change in the override amount is the directly proportional relationship and the region in which the override amount is constant while the deviation amount changes.

There are two regions in which the override amount is constant while the deviation amount changes, including a region (first region) in which the deviation amount is equal to or less than the "first deviation threshold value" and a region (second region) in which the deviation amount is equal to or greater than the "second deviation threshold value".

The second deviation threshold value is set to be larger than the first deviation threshold value. In other words, the first region corresponds to the smaller deviation amount than that of the second region.

In the first region, even if the deviation amount changes in the first region, the override amount is fixed to the minimum override value. Further, in the second region, even if the deviation amount changes in the second region, the override amount is fixed to the maximum value.

Note that in the variation also, as similar to the first embodiment, as one example, the minimum override value is set to zero ("0").

The region in which a relationship between the change in the deviation amount and the change in the override amount is the directly proportional relationship (proportional region) is a region in which the deviation amount exceeds the first region and the deviation amount is less than the second region.

In the proportional region, when the deviation amount is the minimum value in the proportional region, the override amount is set to zero. Further, in the proportional region, when the deviation amount is the maximum value in the proportional region, the override amount is set to a maximum value that is set to be larger than the minimum override value in advance.

In other words, when the deviation amount is less than the first deviation threshold value, the override amount is calculated as zero and when the deviation amount exceeds the second deviation threshold value, the override amount is calculated as the maximum value.

In the region where the deviation amount is equal to or larger than the first deviation threshold value and the deviation amount is equal to or less than the second deviation threshold value, as the deviation amount increases, the override amount is increased from zero.

In the override amount calculation map illustrated in FIG. 21, by setting the deviation between the first deviation threshold value and the second deviation threshold value, the change rate of the override amount relative to the change in the deviation amount can be changed.

In other words, by decreasing the deviation between the first deviation threshold value and the second deviation threshold value, the change rate of the override amount relative to the change in the deviation amount can be increased. On the other hand, by increasing the deviation between the first deviation threshold value and the second deviation threshold value, the change rate of the override amount relative to the change in the deviation amount can be reduced.

(2) Although in the first embodiment, the braking/driving force map is used to calculate the basic braking force and the basic driving force, the method is not limited thereto. In other words, for example, an equation set in advance may be used to calculate the basic braking force and the basic driving force.

Among the basic braking forces, an equation for calculating the regenerative braking force is formed from, for example, a relationship among the operation amount of the accelerator pedal AP, the operation amount of the brake pedal BP, the regeneration limit line, the regenerative coordination distribution line and the like. Further, among the basic braking forces, an equation for calculating the friction braking force is formed from, for example, a relationship among the operation amount of the accelerator pedal AP, the operation amount of the brake pedal BP, performances of the master cylinder 18 and the wheel cylinder WS, a car weight of the vehicle C and the like. An equation for calculating the basic driving force is formed from, for example, a relationship among the operation amount of the accelerator pedal AP, the vehicle speed, the performance of the driving motor DM, a car weight of the vehicle C and the like.

(3) In the first embodiment, as the drive source that gives the driving force to the wheel W, the driving motor DM is used, but the source is not limited thereto, and as the drive source, the engine may be used.

REFERENCE SIGNS LIST

1 . . . Braking/driving force control device
2 . . . ITS control unit
4 . . . Motor control unit
6 . . . Friction braking force control unit
8 . . . External environment recognition sensor
10 . . . Speed setting switch
12 . . . Mode selection switch
14 . . . Vehicle speed calculation unit
16 . . . Wheel speed sensor
18 . . . Master cylinder
20 . . . ITS braking/driving force calculation unit
22 . . . Driver request braking/driving force detection unit
24 . . . Filter correction unit
26 . . . ITS output setting unit
26a . . . Correction processing unit
26b . . . Determination condition addition unit
26c . . . Braking/driving force value switching unit
26d . . . Minimum value selection unit
30 . . . Override amount calculation unit
32 . . . Peak hold processing unit
32a . . . Maximum value selection unit
32b . . . Lower limit value storage unit
32c . . . Output value switching unit
32d . . . Delay processing unit
34 . . . Filter correction value calculation unit
40 . . . Basic braking/driving force calculation unit
42 . . . Slope detection unit
44 . . . Braking/driving force correction unit
46 . . . Arbitration control unit
48 . . . Braking/driving force distribution unit
50 . . . Driving force control unit
52 . . . First request braking force calculation unit
54 . . . Regenerative braking force control unit
56 . . . Override determination unit
60 . . . Second request braking force calculation unit
62 . . . Request braking force summation unit
64 . . . Regenerative coordination control unit
66 . . . Friction braking force calculation unit
68 . . . Braking hydraulic pressure control unit
AP . . . Accelerator pedal
APS . . . Accelerator sensor
DM . . . Driving motor
MS . . . Motor rotation speed sensor
WS . . . Wheel cylinder
INV . . . Inverter
BAT . . . Battery
BP . . . Brake pedal
BPS . . . Brake sensor
C . . . Vehicle
TR . . . Transmission
W . . . Wheel (left front wheel WFL, right front wheel WFR, left rear wheel WRL, right rear wheel WRR)

The invention claimed is:

1. A braking/driving force control method comprising:
maintaining, when an acceleration/deceleration of a vehicle is controlled based on a target braking/driving torque that allows the vehicle to travel at a travelling speed set by a driver, a state of controlling the acceleration/deceleration of the vehicle based on the target braking/driving torque until a driver demand torque depending on an operation amount of an accelerator pedal exceeds the target braking/driving torque; and
controlling the acceleration/deceleration based on the driver demand torque when the driver demand torque exceeds the target braking/driving torque; wherein
when the operation amount of the accelerator pedal decreases after the driver demand torque exceeds the target braking/driving torque, the driver demand torque is decreased depending on a decrease in the operation amount of the accelerator pedal, and a decrease rate of the driver demand torque depending on the decrease in the operation amount of the accelerator pedal is set to be smaller than a decrease rate of the driver demand torque depending on the operation amount of the accelerator pedal for a case where the driver does not set the travelling speed, and the acceleration/deceleration is controlled based on a current driver demand torque; and
when the operation amount of the accelerator pedal becomes zero subsequently, the acceleration/deceleration is controlled based on the target braking/driving torque.

2. The braking/driving force control method according to claim 1, comprising:
detecting the travelling speed of the vehicle;
calculating an override amount depending on a deviation amount in which the detected travelling speed exceeds the set travelling speed; and changing the decrease rate of the driver demand torque depending on a decrease in the operation amount of the accelerator pedal based on the calculated override amount.

3. The braking/driving force control method according to claim 2, wherein
when the deviation amount is less than a first deviation threshold value set in advance, the override amount is set to a minimum override value set in advance;
when the deviation amount exceeds a second deviation threshold value set to be larger than the first deviation threshold value set in advance, the override amount is set to a maximum value set to be larger than the minimum override value set in advance; and
when the deviation amount is equal to or larger than the first deviation threshold value and the deviation amount is equal to or less than the second deviation threshold value, as the deviation amount increases, the override amount is increased from the minimum override value.

4. The braking/driving force control method according to claim 2, wherein when the driver sets the travelling speed, the override amount is held after the driver demand torque exceeds the target braking/driving torque until the operation amount of the accelerator pedal becomes zero.

5. The braking/driving force control method according to claim 1, wherein when the operation amount of the accelerator pedal decreases after the driver demand torque exceeds the target braking/driving torque, a change in a braking/driving force depending on an operation in a decreasing direction of the accelerator pedal is delayed.

6. A braking/driving force control device comprising:
an accelerator sensor configured to detect an operation amount of an accelerator pedal;
a vehicle speed sensor configured to detect a travelling speed of a vehicle; and
a computer configured to:
calculate a target braking/driving torque depending on a travelling speed set by a driver;
calculate a driver demand torque depending on the detected operation amount of the accelerator pedal; and
control a braking force and a driving force of the vehicle to control an acceleration/deceleration of the vehicle based on the driver demand torque or the target braking/driving torque;
maintain a state of controlling the acceleration/deceleration based on the target braking/driving torque until the driver demand torque exceeds the target braking/driving torque, when the acceleration/deceleration is controlled based on the target braking/driving torque;
control the acceleration/deceleration based on the driver demand torque, when the driver demand torque exceeds the target braking/driving torque;
when the operation amount of the accelerator pedal decreases after the driver demand torque exceeds the target braking/driving torque, decrease the driver demand torque depending on a decrease in the operation amount of the accelerator pedal, set a decrease rate of the driver demand torque depending on the decrease in the operation amount of the accelerator pedal to be smaller than a decrease rate of the driver demand torque depending on the operation amount of the accelerator pedal for a case where the driver does not set the travelling speed, and control the acceleration/deceleration depending on a current driver demand torque; and
when the operation amount of the accelerator pedal becomes zero subsequently, return to a state where the acceleration/deceleration is controlled depending on the target braking/driving torque.

\* \* \* \* \*